US008326728B1

(12) United States Patent
Devaney et al.

(10) Patent No.: US 8,326,728 B1
(45) Date of Patent: Dec. 4, 2012

(54) INCOME PRODUCT SELECTOR—PURCHASE SOLVER

(75) Inventors: Stephen J. Devaney, Lexington, MA (US); Andrey Lyalko, Boston, MA (US); Steven A. Feinschreiber, Norton, MA (US); Klara B. Iskoz, Newton, MA (US); Robert L. Macdonald, Duxbury, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/312,422

(22) Filed: Dec. 6, 2011

(51) Int. Cl.
G06Q 40/00 (2012.01)
(52) U.S. Cl. ......................... 705/36 R; 705/35
(58) Field of Classification Search .................. None
See application file for complete search history.

(56) References Cited

U.S. PATENT DOCUMENTS

| | | | | |
|---|---|---|---|---|
| 5,875,437 | A * | 2/1999 | Atkins | 705/40 |
| 5,933,815 | A * | 8/1999 | Golden | 705/36 R |
| 6,253,192 | B1 * | 6/2001 | Corlett et al. | 705/36 R |
| 6,985,880 | B1 * | 1/2006 | Hodgdon et al. | 705/36 T |
| 7,447,651 | B1 * | 11/2008 | Herbst et al. | 705/36 R |
| 7,577,597 | B1 * | 8/2009 | Allison et al. | 705/35 |
| 7,647,261 | B2 | 1/2010 | Merton et al. | 705/35 |
| 7,711,619 | B2 | 5/2010 | Merton et al. | 705/35 |
| 7,769,659 | B2 * | 8/2010 | Arena et al. | 705/36 R |
| 7,835,963 | B1 * | 11/2010 | Borzych et al. | 705/35 |
| 7,860,773 | B1 * | 12/2010 | Golden | 705/36 R |
| 2002/0002521 | A1 * | 1/2002 | Shearer et al. | 705/36 |
| 2002/0035527 | A1 * | 3/2002 | Corrin | 705/35 |
| 2002/0138386 | A1 * | 9/2002 | Maggioncalda et al. | 705/36 |
| 2002/0188536 | A1 * | 12/2002 | Milosavljevic et al. | 705/35 |
| 2003/0078867 | A1 * | 4/2003 | Scott et al. | 705/36 |
| 2003/0233301 | A1 * | 12/2003 | Chen et al. | 705/36 |
| 2004/0054610 | A1 * | 3/2004 | Amstutz et al. | 705/36 |
| 2004/0158517 | A1 * | 8/2004 | Mahaney et al. | 705/36 |
| 2005/0004856 | A1 * | 1/2005 | Brose et al. | 705/35 |
| 2005/0246260 | A1 * | 11/2005 | Hodgdon et al. | 705/36 |
| 2006/0020531 | A1 * | 1/2006 | Veeneman et al. | 705/35 |
| 2006/0036524 | A1 * | 2/2006 | Capanna | 705/35 |
| 2006/0074788 | A1 * | 4/2006 | Grizack et al. | 705/35 |
| 2006/0095351 | A1 * | 5/2006 | Gershenfeld et al. | 705/35 |
| 2006/0111997 | A1 * | 5/2006 | Abbott et al. | 705/35 |

(Continued)

OTHER PUBLICATIONS

Making ends meet: How will the elderly manage their finances and post-retirement expenses?; George p. Moschis, Janée N Burkhalter; Journal of Financial Services Marketing; London: Dec. 2007. vol. 12, Iss. 3; Received (in revised form): Apr. 16, 2007; 8-pages.*

(Continued)

*Primary Examiner* — Gregory Johnson
(74) *Attorney, Agent, or Firm* — Proskauer Rose LLP

(57) ABSTRACT

A target income mix is expressed as a set of weights in a portfolio of one or more classes of income generating financial products to meet a first income need indicative of essential expenses and a second income need indicative of discretionary expenses for a user. The target income mix is converted to dollar amounts to invest in the classes of income generating products to meet the first and second income needs. Using the target income mix percentage weights, initial purchase amounts are determined from the user's available assets. The initial purchase amounts for each of the classes of income generating products can be adjusted until the overall portfolio is projected to produce enough after-tax income to meet the first income need at a first predetermined confidence level or return assumption and meet the first income need and the second income need at a second predetermined confidence level.

21 Claims, 4 Drawing Sheets

U.S. PATENT DOCUMENTS

| | | | | |
|---|---|---|---|---|
| 2006/0190372 | A1* | 8/2006 | Chhabra et al. | 705/35 |
| 2006/0212380 | A1* | 9/2006 | Williams et al. | 705/35 |
| 2006/0241989 | A1 | 10/2006 | Walters et al. | 705/7 |
| 2007/0011071 | A1* | 1/2007 | Cuscovitch et al. | 705/35 |
| 2007/0055602 | A1 | 3/2007 | Mohn | 705/36 |
| 2007/0061238 | A1* | 3/2007 | Merton et al. | 705/36 R |
| 2007/0106589 | A1* | 5/2007 | Schirripa | 705/36 R |
| 2007/0156559 | A1* | 7/2007 | Wolzenski et al. | 705/35 |
| 2007/0168302 | A1* | 7/2007 | Giovinazzo et al. | 705/36 R |
| 2007/0192224 | A1* | 8/2007 | Quayle et al. | 705/36 R |
| 2007/0244777 | A1 | 10/2007 | Torre et al. | 705/35 |
| 2007/0250427 | A1* | 10/2007 | Robinson | 705/36 R |
| 2007/0271201 | A1* | 11/2007 | Armand et al. | 705/36 R |
| 2008/0114703 | A1* | 5/2008 | Dahlberg et al. | 705/36 R |
| 2008/0189224 | A1* | 8/2008 | Coopersmith | 705/36 T |
| 2008/0301035 | A1* | 12/2008 | Mercier et al. | 705/37 |
| 2009/0006269 | A1 | 1/2009 | Klayman | 705/36 |
| 2009/0037312 | A1* | 2/2009 | Freyer | 705/35 |
| 2009/0094168 | A1* | 4/2009 | Polkinghorn et al. | 705/36 R |
| 2009/0192947 | A1* | 7/2009 | Kenigsberg et al. | 705/36 R |
| 2009/0281959 | A1* | 11/2009 | Abidi et al. | 705/36 R |
| 2009/0319440 | A1* | 12/2009 | Montgomery et al. | 705/36 R |
| 2010/0004957 | A1* | 1/2010 | Ball | 705/4 |
| 2010/0017342 | A1* | 1/2010 | Boscaljon | 705/36 R |
| 2010/0030699 | A1* | 2/2010 | Caputo et al. | 705/36 R |
| 2010/0036760 | A1* | 2/2010 | Abeles et al. | 705/31 |
| 2010/0179920 | A1* | 7/2010 | Snodgrass | 705/36 R |
| 2010/0185561 | A1* | 7/2010 | Torre et al. | 705/36 R |
| 2010/0211403 | A1* | 8/2010 | Allsup et al. | 705/2 |
| 2010/0256996 | A1* | 10/2010 | Gerber | 705/4 |
| 2010/0287086 | A1* | 11/2010 | Harris et al. | 705/35 |
| 2010/0306127 | A1 | 12/2010 | Weinberger et al. | 705/36 |
| 2010/0312603 | A1* | 12/2010 | Overman et al. | 705/9 |
| 2011/0208672 | A1* | 8/2011 | Robb | 705/36 R |
| 2012/0054121 | A1* | 3/2012 | Fiala et al. | 705/36 R |

OTHER PUBLICATIONS

Preparing for the Good Life; Lacamp, Jim; Reddell, Pat; American Printer; Sep. 1989; 203, 6; 2-pages.*

Optimal Asset Allocation Towards the End of the Life Cycle: To Annuitize or Not to Annuitize?; Moshe Arye Milevsky; SSRN Working Paper Series. Rochester; Nov. 1996; 48-pages.*

'I'd rather keep running to the end and then jump off the cliff'. Retirement Decisions: Who Decides?; Sarah Vickerstaff; Journal of Social Policy; Jul. 2006; 35; 18-pages.*

Solving an Employer's Fiduciary Dilemma: Liability, Discretion and the Role of the Qualified Plan Advisor; Pete Swisher. Journal of Financial Planning. Denver: Feb. 2004. vol. 17, Iss. 2; 7-pages.*

401(K) Plans: Sailing from Safe Harbor to Perfect Storm; Adam C Pozek; Journal of Pension Benefits; New York: Autumn 2009. vol. 17, Iss. 1; 4-pages.*

Ten Common Errors; Bruce D Steiner. Trusts & Estates. New York: Sep. 2008. vol. 147, Iss. 9; 4-pages.*

* cited by examiner

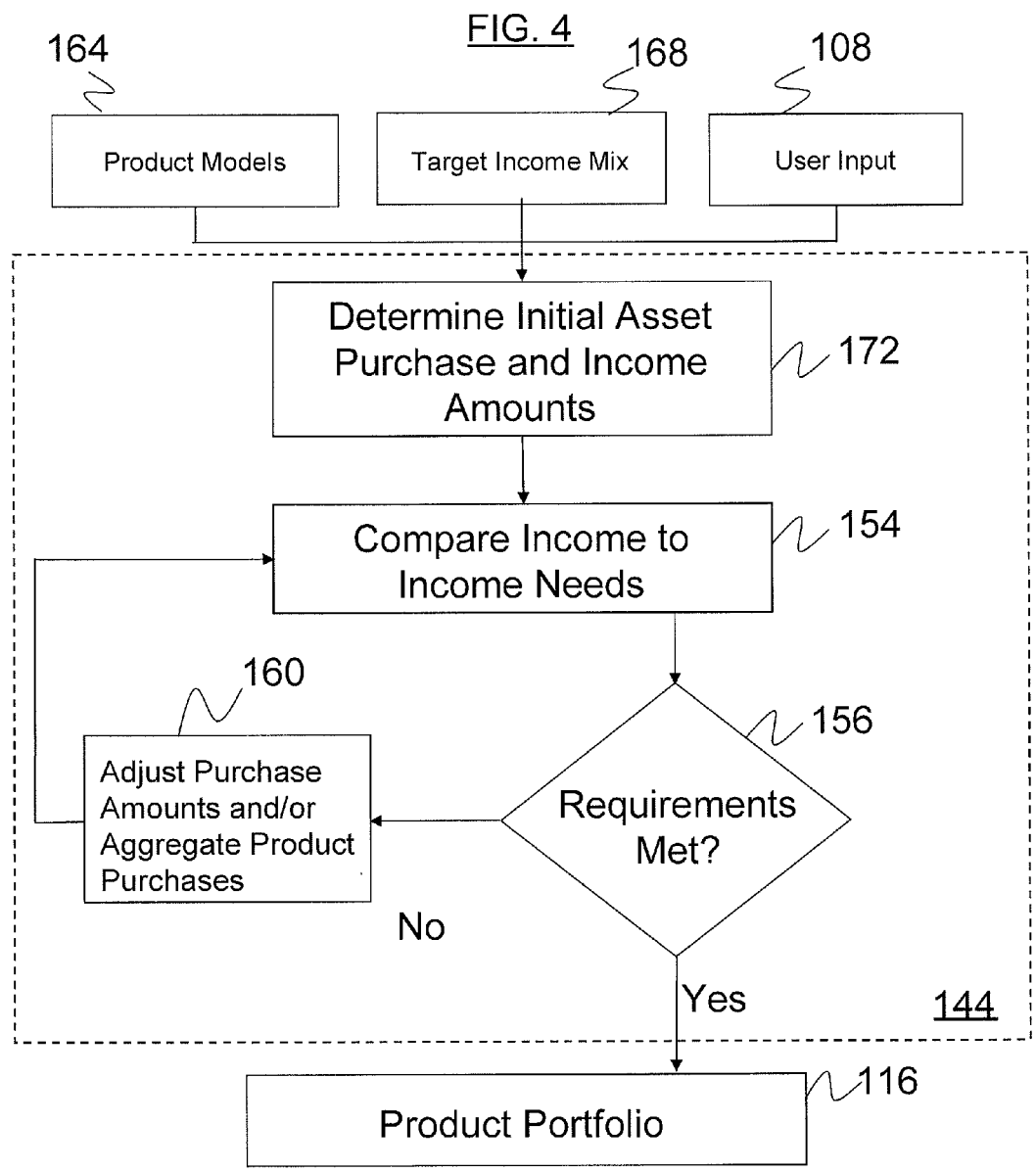

US 8,326,728 B1

INCOME PRODUCT SELECTOR—PURCHASE SOLVER

FIELD OF THE INVENTION

The invention relates generally to methods and systems, including computer program products, for developing retirement income plans, and more particularly to an income product selector that calculates portfolios of income-generating financial products to help meet the retiree's income needs throughout retirement.

BACKGROUND

In general, retirement income plans are strategies that can extract retirement income in an efficient way from one's savings in combination with income from existing sources (if any) so that, to the extent possible, expenses in retirement are covered throughout one's retirement. Efficiency here can refer to increasing the amount of income paid by a given asset amount invested, reducing the asset amount invested to produce a given income amount, reducing taxes, taking into consideration the major risks of retirement such as longevity risk, asset allocation risk, inflation risk, withdrawal rate risk, and healthcare risk. As such, retirement income plans are complicated to create. A retirement income plan can be personalized to the retiree's needs and able to meet their financial goals, easy to understand, set up and maintain, and provide confidence that the income the plan generates will last throughout the retiree's retirement. While saving for retirement is an ongoing financial goal for individuals, retirement income plans become more important as an individual approaches retirement. For many retirees, Social Security, pensions and other guaranteed income sources may not provide enough income to fully cover their expenses in retirement, so they may have to rely on their savings to cover any shortages of income.

Part of the challenge is that developing an actionable and effective retirement income plan is a complex activity that requires balancing a retiree's financial means, his/her income needs in retirement and his/her investment preferences. The average retiree may not be knowledgeable about the features of financial products that can be used to produce income in retirement, and thus most retirees need assistance navigating the retirement income landscape.

Advisors face their own set of challenges. The planning process today can include a lot of guesswork and may not be free of an individual advisor's biases. The calculations that are required to create an income plan are complicated, highly manual, and often include "rule of thumb" and other shortcuts that may or may not be right for every individual retiree. As a result, because of lack of financial knowledge, it can be difficult for the average retiree to compare retirement income plans prepared by different advisors and choose the plan right for them.

SUMMARY OF THE INVENTION

An Income Product Selector ("IPS") can be used to automatically generate income plans (or income portfolios) for users. An income portfolio can be a diversified portfolio of financial products that collectively produce the desired amount of income projected to last throughout retirement (lifetime income portfolio) or for a fixed number of years (additional income portfolio). In IPS, income portfolios can be represented by a high level Target Income Mix ("TIM"), which can be a combination of percent allocations to multiple classes of income-generating products ("income classes") and asset amounts that can be invested in each of the income classes so that the overall portfolio produces the needed income projected to last throughout the user's retirement horizon. Each income class can be represented by at least one or more of income generating financial products that can be purchased when the income plan is implemented. Users can be presented with multiple strategies that can include multiple income products (e.g., a combination of at least one or more of a variable annuity, a fixed annuity, and/or a portfolio with a systematic withdrawal plan ("SWP")). A user can visually compare multiple strategies to understand the benefits and tradeoffs of each approach. The IPS can quantify the impact of investment choices on their income strategy.

An IPS can answer key investor questions on retirement and income planning. An IPS can present incomes as part of a bundled solution, and provide specific purchase suggestions (for example, "Purchase X dollars of product A from your tax-deferred accounts and Y dollars of product B from your taxable account"). An IPS can clearly show the value of the portfolio over time and in different market conditions that can be represented by different market confidence levels. In addition, an IPS can allow the customer to edit the suggested portfolio and make product substitutions, so that they can develop a portfolio that best meets their needs. An IPS can enable customers to see the trade-offs associated with different product purchases by enabling them to compare portfolios and scenarios against each other. Finally, an IPS can be used by investment professionals to provide either advice to individual investors or guidance to a class of investors.

In one aspect, there is a method of determining, by a computing device, a first income need to meet essential expenses for a user during retirement and a second income need to meet discretionary expenses in retirement for the user. A default target income mix is calculated to meet the first income need and the second income need. The default target income mix is a set of weights of one or more classes of income generating products. Qualitative investment preferences are quantified for the user. The default target income mix is adjusted using the quantification of the qualitative investment preferences to form an adjusted target income mix including a second set of weights of the one or more classes of income generating products.

In another aspect, there is a computer program product, tangibly embodied in a computer-readable storage medium that includes instructions to cause a data processing apparatus to determine a first income need to meet essential expenses for a user during retirement and a second income need to meet discretionary expenses in retirement for the user. The computer program product includes instructions to cause the data processing apparatus to calculate a default target income mix to meet the first income need and the second income need. The default target income mix is a set of weights of one or more classes of income generating products. Qualitative investment preferences are quantified for the user. The default target income mix is adjusted using the quantification of the qualitative investment preferences to form an adjusted target income mix including a second set of weights of the one or more classes of income generating products.

In yet another aspect, there is a system that includes a computing processor to determine a first income need to meet essential expenses for a user during retirement, and a second income need to meet discretionary expenses for the user during retirement. A default target income mix is calculated by the computing processor to meet the first income need and the second income need. The default target income mix is a set of weights of one or more classes of income generating products. Qualitative investment preferences are quantified for the user. The default target income mix is adjusted using the quantification of the qualitative investment preferences to form an adjusted target income mix including a second set of weights of the one or more classes of income generating products.

In still another aspect, there is a system including means for determining a first income need to meet essential expenses for a user during retirement and means for determining a second income need to meet discretionary expenses for the user during retirement. The system includes means for calculating a default target income mix to meet the first income need and the second income need. The default target income mix is a set of weights of one or more classes of income generating products. The system further includes means for quantifying qualitative investment preferences for the user, and means for adjusting the default target income mix using the quantification of the qualitative investment preferences to form an adjusted target income mix including a second set of weights of the one or more classes of income generating products.

In another aspect, there is a method including receiving, by a computing device, a target income mix for a user. The target income mix is expressed as a set of weights in a portfolio of one or more classes of income generating financial products to meet a first income need indicative of essential expenses for the user and a second income need indicative of discretionary expenses for the user. The target income mix for the user is converted to dollar amounts to invest in the one or more classes of income generating products to meet the first income need and the second income need. Information about available assets and their account location is received. Using the target income mix percentage weights, initial purchase amounts from the user's available assets are determined for the one or more classes of income generating products. The amount of income that the one or more classes of income generating products are projected to produce throughout the user's retirement is determined. The first income need and second income need are compared to income projected to be produced by the one or more classes of income generating products purchased using the initial purchase amounts. The purchase amounts for each of one or more classes of income generating products are adjusted until the overall portfolio is projected to produce enough after-tax income to (i) meet the first income need at a first predetermined confidence level or return assumption and (ii) meet the first income need and the second income need at a second predetermined confidence level.

In still another aspect, there is a computer program product, tangibly embodied in a computer-readable storage medium that includes instructions being operable to cause a data processing apparatus to receive a target income mix for a user. The target income mix is expressed as a set of weights in a portfolio of one or more classes of income generating financial products to meet a first income need indicative of essential expenses for the user and a second income need indicative of discretionary expenses for the user. The target income mix for the user is converted to dollar amounts to invest in the one or more classes of income generating products to meet the first income need and the second income need. Information about available assets and their account location is received. Using the target income mix percentage weights, initial purchase amounts from the user's available assets are determined for the one or more classes of income generating products. The amount of income that the one or more classes of income generating products are projected to produce throughout the user's retirement is determined. The first income need and second income need are compared to income projected to be produced by the one or more classes of income generating products purchased using the initial purchase amounts. The purchase amounts for each of one or more classes of income generating products are adjusted until the overall portfolio is projected to produce enough after-tax income to (i) meet the first income need at a first predetermined confidence level or return assumption and (ii) meet the first income need and the second income need at a second predetermined confidence level.

In another aspect, there is a system that includes a computing processor configured to receive a target income mix for a user. The target income mix is expressed as a set of weights in a portfolio of one or more classes of income generating financial products to meet a first income need indicative of essential expenses for the user and a second income need indicative of discretionary expenses for the user. The target income mix for the user is converted to dollar amounts to invest in the one or more classes of income generating products to meet the first income need and the second income need. Information about available assets and their account location is received. Using the target income mix percentage weights, initial purchase amounts from the user's available assets are determined for the one or more classes of income generating products. The amount of income that the one or more classes of income generating products are projected to produce throughout the user's retirement is determined. The first income need and second income need are compared to income projected to be produced by the one or more classes of income generating products purchased using the initial purchase amounts. The purchase amounts for each of one or more classes of income generating products are adjusted until the overall portfolio is projected to produce enough after-tax income to (i) meet the first income need at a first predetermined confidence level or return assumption and (ii) meet the first income need and the second income need at a second predetermined confidence level.

In yet another aspect, there is a system that includes means for receiving a target income mix for a user. The target income mix is expressed as a set of weights in a portfolio of one or more classes of income generating financial products to meet a first income need indicative of essential expenses for the user and a second income need indicative of discretionary expenses for the user. The system includes means for converting the target income mix for the user to dollar amounts to invest in the one or more classes of income generating products to meet the first income need and the second income need, and means for receiving information about available assets and their account location. The system further includes means for determining, using the target income mix percentage weights, initial purchase amounts from the user's available assets for the one or more classes of income generating products, and means for determining the amount of income that the one or more classes of income generating products are projected to produce throughout the user's retirement. The system also includes means for comparing the first income need and second income need to income projected to be produced by the one or more classes of income generating products purchased using the initial purchase amounts, and means for adjusting the purchase amounts for each of one or more classes of income generating products until the overall portfolio is projected to produce enough after-tax income to (i) meet the first income need at a first predetermined confidence level or return assumption and (ii) meet the first income need and the second income need at a second predetermined confidence level.

In another aspect, there is a method that includes receiving, by a computing device, a target income mix defining a set of weights and assets amounts to invest in one or more classes of income generating products to meet a first income need for essential expenses of a user and a second income need for discretionary expenses of the user. The target income mix can be an adjusted target income mix accounting for user preferences and/or user account information. Each income class of the target income mix can be mapped into an income product model based on investment preferences of the user. Income product models can be percentage allocations to individual income-generating financial products within each income class. An initial purchase amount for each income class can be distributed across the one or more income products in the appropriate model. The initial purchase amounts for each income product can be adjusted to form final income product purchase amounts that meet the first income need at a first predetermined confidence level or other return assumption and match the first income need and the second income need, collectively, at a second predetermined confidence level or other return assumption.

In still another aspect, there is a computer program product, tangibly embodied in a computer-readable storage medium, that includes instructions being operable to cause a data processing apparatus to receive a target income mix defining a set of weights of one or more classes of income generating products to meet a first income need for essential expenses of a user and a second income need for discretionary expenses of the user. Each income class of the target income mix is mapped into one or more income generating product models based on investment preferences of the user. The instructions are operable to cause the data processing apparatus to distribute an initial purchase amount for each income class across one or more income generating products in each of the income generating product models, and adjust the initial purchase amounts for each income generating product to form adjusted product purchase amounts that (i) meet the first income need at a first predetermined confidence level and (ii) match the first income need and the second income need at a second predetermined confidence level.

In yet another aspect, there is a system that includes a computing processor configured to receive a target income mix defining a set of weights of one or more classes of income generating products to meet a first income need for essential expenses of a user and a second income need for discretionary expenses of the user. Each income class of the target income mix is mapped into one or more income generating product models based on investment preferences of the user. The computing processor configured to distribute an initial purchase amount for each income class across one or more income generating products in each of the income generating product models, and adjust the initial purchase amounts for each income generating product to form adjusted product purchase amounts that (i) meet the first income need at a first predetermined confidence level and (ii) match the first income need and the second income need at a second predetermined confidence level.

In another aspect, there is a system comprising means for receiving a target income mix defining a set of weights of one or more classes of income generating products to meet a first income need for essential expenses of a user and a second income need for discretionary expenses of the user, and means for mapping each income class of the target income mix into one or more income generating product models based on investment preferences of the user. The system includes means for distributing an initial purchase amount for each income class across one or more income generating products in each of the income generating product models, and means for adjusting the initial purchase amounts for each income generating product to form adjusted product purchase amounts that (i) meet the first income need at a first predetermined confidence level and (ii) match the first income need and the second income need at a second predetermined confidence level.

In other examples, any of the aspects above, or any apparatus, system or device, or method, process or technique, described herein, can include one or more of the following features.

Confidence levels are a way to describe potential performance of the capital markets and portfolios of assets using a distribution of returns that is obtained by using a Monte Carlo simulation method. Monte Carlo simulations are useful for managing expectations of the future because they provide a potential range of outcomes for a particular situation. IPS can use Monte Carlo simulated market returns in a variety of ways. They are used to project the potential performance of an income generating product that has an underlying investment portfolio (e.g. variable annuities or SWP) to calculate the income this product may pay in the future. This projected income can be calculated at particular confidence levels that describe the entire distribution of returns. Confidence levels are measured in percentage terms, and if a value is reported at a confidence level of 50%, for example, it means that 50% of the time, the outcome will be at least equal to the reported value.

IPS can also use fixed return assumptions that describe particular paths of possible future returns and/or comply with regulatory mandates for performance illustration. For example, IPS can use the assumption of a constant 0% return throughout one's retirement to match essential income need as this helps meet the essential expenses even if the assets are not invested in the market.

In various embodiments, the first pre-determined confidence level can be the 0% return assumption, and the second pre-determined confidence level can be the 50% confidence level. In addition, other confidence levels can also be considered to present a range of hypothetical projections of income and assets in the final portfolio, for example, 25%, 75%, or 90% confidence levels.

In certain embodiments, a third income need is determined to meet an income need having a fixed duration shorter than a lifetime need (e.g., a bridge income need). A third target income mix is calculated to meet the third income need. The third target income mix is a third set of weights of the one or more classes of income generating products. The third target income mix can include a first percentage of assets to invest in fixed annuities and a second percentage of assets to invest in a systematic withdrawal plan to meet the third income need. The third income need can be accounted for by adding the third income need to the first income need. The portfolio of the classes of income generating products can produce enough income to meet the third income need.

If the user has an income need for a fixed number of years in addition to the user's lifetime income need, then this income need can be solved for after the TIM and product portfolio have been calculated for the length of the entire retirement (e.g., after the lifetime income need has been met). The calculation of the Target Income Mix to meet the additional income need can begin by determining a default target income mix. The default target income mix can be an initial percent allocation to one or more income classes.

In some embodiments, each of the adjusted percentage weights that represent the target income mix (and a corresponding amount of assets to invest in each of one or more income classes in the target income mix) can be rounded to the nearest 10% or any other increment. In various embodiments, the one or more classes of income generating products can include at least one of fixed annuities, variable annuities, and a systematic withdrawal plan. The target income mix can include at least one or more of a first percentage of assets to inmost in the fixed annuities and a second percentage of assets to invest in the variable annuities and a third percentage of assets to invest in the systematic withdrawal plan.

In various embodiments, the first percentage of assets, the second percentage of assets and the third percentage of assets meet the first income need and the second income need. In some embodiments, the first percentage of assets, the second percentage of assets and the third percentage of assets meet a bridge income need. In certain embodiments, the percentage of assets invested in the fixed annuities and the percentage of assets invested in the systematic withdrawal plan meet the bridge income need.

The systematic withdrawals from an investment portfolio has can be based on a pre-calculated, sustainable inflation-adjusted withdrawal rate. The default target income mix and the adjusted target income mix are calculated without knowledge of the user's ability to fund the one or more classes of income generating products. The first income need can be met at a 0% return or a first pre-determined confidence level or any other return assumption. The first income need and the second income need combined can be met at a second pre-determined confidence level or any other return assumption.

In some embodiments, the default target income mix and the adjusted target income mix are calculated without knowledge of the user's ability to fund the one or more classes of income generating products.

The pre-calculated sustainable inflation-adjusted withdrawal rate can be computed to make sure that the user's investment portfolio continues to provide withdrawal income throughout the user's retirement horizon. The initial dollar amount of income can be calculated as the sustainable withdrawal rate times the portfolio balance, and all subsequent payments are the previous income amount increased by inflation. The sustainable rate can be solved for so that the income withdrawn from the portfolio last thru the end of retirement, at which point the portfolio is depleted. This rate can be calculated using simulated returns at a pre-determined confidence level. The sustainable withdrawal rate can be calculated using any other reasonable and generally accepted definition of a withdrawal rate.

In some examples, the sustainable inflation-adjusted withdrawal rate can be defined as an inflation-adjusted withdrawal rate that will completely deplete the portfolio by the end of the retirement horizon at the 90% level of confidence. This rate can depend on the length of retirement and asset allocation.

In various embodiments, a set of questions is provided to the user to determine the qualitative investment preferences. Qualitative answers to investment preference questions are converted into quantitative factors that are used to adjust the default target income mix weights. Each factor reflects the quantitative attribute score, a question importance weight, an answer weight, and a question-attribute weight.

In some embodiments, variability of expected retirement income and expenses can be analyzed and expected variable income needs can be leveled to provide consistent inputs.

In various embodiments, the income from the one or more classes of income generating products purchased using the initial purchase amounts and any subsequent purchase amounts can be matched at the at the evaluation year. In some examples, the evaluation year can be midpoint of a user's retirement horizon for the lifetime TIM (e.g., a user's entire retirement). In some examples, the evaluation year can also be the midpoint of the user's additional income horizon (if any) for the separate TIM to meet the additional income need. These amounts can also be calculated at other points during the user's retirement. The income from the one or more classes of income generating products can be calculated using predetermined confidence levels representing a Monte-Carlo simulated distribution or any other representation of hypothetical income paid by the one or more classes of income generating products over the user's retirement and/or additional income horizons.

In various embodiments, information about a user's assets can be received by the computing device. At various stages of the algorithm where purchase amounts of the one or more income classes or individual income generating products can be determined by a computing device, the user's assets can be aggregated by the account tax type. Rules for the funding order in which income classes or individual income-generating products can be purchased and taxation of assets used for purchases and/or income from each income class or product purchased can be applied.

In certain embodiments, the projected pre-tax and after-tax income that can be produced by each of one or more classes of income generating products over a user's retirement horizon is calculated. The projected pre-tax and after-tax income can be calculated throughout the user's retirement horizon at the predetermined confidence levels representing a Monte-Carlo simulated distribution of hypothetical income paid by the one or more classes of income generating products over the user's retirement horizon. The projected pre-tax and after-tax income can be calculated throughout the user's retirement horizon at a predetermined return assumption representing income projected to be paid by the one or more classes of income generating products over the user's retirement horizon in particular market conditions specified by the predetermined return assumption. The predetermined return assumption can be a 0% fixed rate of return.

In some embodiments, the projected pre-tax and after-tax income from the one or more classes of income generating products purchased using the initial purchase amounts and any subsequent purchase amounts at the midpoint in a user's retirement horizon is calculated. The asset amounts for the target income mix can be calculated by the computing device. The user's assets can be aggregated by their tax treatment according to the account type. The purchase amounts can be calculated following a pre-determined account type funding order for each of one or more classes of income generating products. The purchase amounts can be calculated following specific rules of taxation of assets and income for each account type that may be used to fund purchases of one or more classes of income generating products. The purchase amounts can be compared to the predetermined minimum investment amounts for each of one or more classes of income generating products.

The purchase amounts can be redistributed as necessary if minimum investment requirements are not met. To meet annuity suitability requirements, purchase amounts for fixed and variable annuity income classes can be compared to the predetermined annuitization limits as percent of liquid net worth and/or as a measure of investable assets. The purchase amounts can be redistributed as necessary if annuity suitability requirements are not met. The purchase amounts can be calculated so that the portfolio weights that they represent are rounded to a predetermined percent increment (e.g., 10%).

Other aspects and advantages of the invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIG. 4 is a flow diagram illustrating a solver for calculating the composition and asset amounts of the product portfolio.

DETAILED DESCRIPTION

Figure 1:
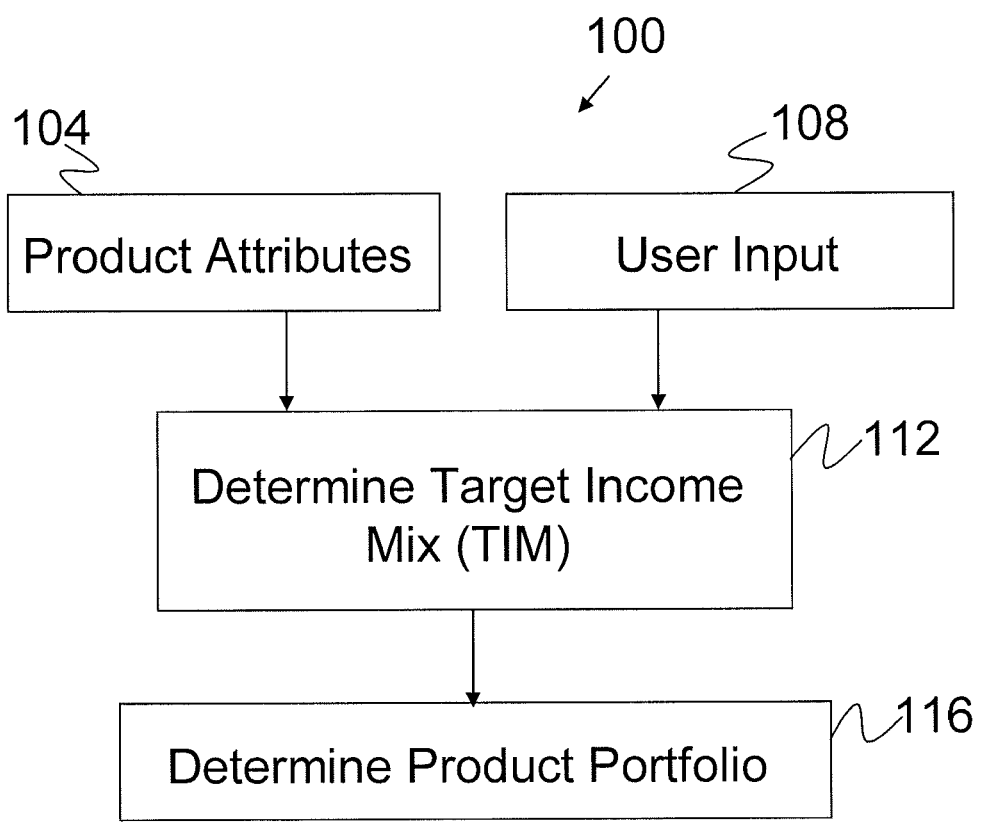
FIG. 1 is a flow diagram illustrating the Income Product Selector methodology.

FIG. 1 is a block diagram illustrating an exemplary IPS methodology 100. IPS can suggest an allocated portfolio of classes of income generating products based on product attributes 104 (e.g., inflation protection, principal preservation, etc.) and user input 108 (e.g., personal data such as age, income needs, tax rate, assets, etc., and user preferences for product attributes 104). The first stage 112 determines the user's Target Income Mix ("TIM") represented by percentage weights and asset amounts to be invested in the classes of income generating products. The second stage 116 determines the final product portfolio by fitting actual income generating products to each class of income generating products to the TIM.

TIMs can be a combination of the percent weights ("TIM weights") and user specific dollar amounts to be invested in each income class to produce enough income to cover the user's income need. Dollar investments and TIM weights can be a function of income need and available savings to meet the income need with varying degrees of success (the user may have saved more than, exactly as much as, or less than is required to meet his or her income need), tax rates, meeting of various business and regulatory requirements (minimum investment amounts, annuity suitability, rounding), and investment preferences for product features. In various examples, each weight can be rounded to a particular increment. For example, each weight can be rounded to an increment of 10%. The sum of the weights must be equal to 100%.

Conceptually, TIMs differ from traditional allocated portfolios in that they can be calculated to support the payment of particular income amounts, and as such can be a combination of asset weights and asset amounts to be invested to produce the needed after-tax income. Because of the differences in taxation of income and/or assets associated with different account types, two different users with different account structures and otherwise identical input information can receive different TIMs.

TIMs can be presented as after-tax asset amounts to be invested into each income class, weights of after-tax asset amounts in the TIM, or pre-tax asset amounts funding each income class from available user account categories.

Income Classes and Products

TIM recommendations can be based on broad categories of income-generating products, or income classes. These income classes can include variable annuities, fixed income annuities, and investment portfolios with a SWP. At the product recommendation level, each income class can be broken down into individual products that can be purchased in the marketplace.

A variable annuity is a variable payment stream that is guaranteed for life, and can be purchased from an insurance company. Monthly payments are generally determined by the performance of the underlying portfolio and the benchmark (hurdle) rate. In some examples, the benchmark rate of 3.5% per annum is the hurdle rate for the underlying portfolio. If the return to the portfolio is greater than the benchmark, the payment goes up; if the portfolio underperforms, the payment decreases. Variable annuities can be available with a number of add-on features. Features can include guarantee periods, asset allocation management (either time varying or static asset allocation), a choice of hurdle rates, and many others. Some variable annuities can be available with riders, such as tax-deferred variable annuities with Guaranteed Minimum Withdrawal Benefit ("GMWB"). GMWBs provide portfolio insurance combined with upside market exposure and liquidity. This product provides an initial minimum payment that potentially ratchets up on each anniversary date if the portfolio value increases. Once a payment is set, it does not decrease unless the portfolio (or a portion) is liquidated. If the investor needs to access the funds in the underlying portfolio, this product allows him or her to liquidate at any time. Charges can apply for a certain period of time and the guaranteed minimum payment can be decreased if some of the portfolio is liquidated.

Similar to variable annuities, a fixed annuity is a payment stream that is guaranteed for life. In the basic case, the payments are level for life. Fixed annuities are also available with an assortment of features including guarantee periods, liquidity features, consumer price index ("CPI") indexing, and growth rates (e.g., cost-of-living adjustments, or "COLA"). The fixed annuity with a COLA provides potential purchasing power preservation by increasing each payment by a predefined rate. In IPS, a fixed annuity with a 10-year guarantee period and a 3% COLA can be used as the proxy to model the income projections for a fixed annuity income class. The period certain annuity is similar to the fixed income annuity. One difference is that the fixed income annuity is a guaranteed stream of level or growing (if a COLA is added) payments for life, while a period certain annuity is a guaranteed stream of fixed payments (with or without a COLA) for the chosen time period. Period-certain annuities are available in a variety of durations, generally starting with 5 years.

The SWP income class can represent a diversified investment portfolio of liquid securities drawn on to cover expenses in retirement. The portfolio can be assumed to consist of a mix of equity, bond and short-term investments that can be rebalanced on a regular basis. This portfolio can be created so that it cannot short securities, purchase or write options, hold any other derivative instruments, or purchase insurance products. The main reason to artificially constrain the portfolio is that this portfolio can be simple enough that the average investor can successfully implement it without extensive knowledge of complex financial instruments. Generally, however, IPS can work with all types of portfolios, whether constrained as described above or not. A SWP is a type of payment agent that can cut the investor a check periodically. Generally, the investor can choose the frequency and amount to be withdrawn, among other options. In some examples, the IPS's default assumption is that the SWP is drawn down at the inflation-adjusted rate that is sustainable for the investor's entire retirement horizon. In various examples, a sustainable inflation-adjusted withdrawal rate can be defined as an inflation-adjusted withdrawal rate that can completely deplete the portfolio by the end of the user's horizon at a predetermined level of confidence, for a given asset allocation. For example, this withdrawal rate can be calculated at the 90% confidence level. In some examples, the SWP income class can be presented together with the asset allocation and the corresponding sustainable withdrawal rate. When the TIM is mapped into product models, the SWP income class can be represented by one or more of Managed Accounts (where the user can pay a management fee to have his or her assets professionally managed), a Single Fund Solution (where the user can buy an asset allocation mutual fund that can invest in multiple asset classes and can maintain either a constant or dynamic asset allocation as in lifecycle or target date funds), or a Self-Managed portfolio of mutual funds and/or other securities that the user can choose to manage him- or herself.

For each income class, there can be a number of contractual and qualitative features that are related to each income class attribute used by the IPS engine to make adjustments to the default TIM. For each income class, a database table can have codes and values for contractual product features and numerical scores for structural attributes.

A number of contractual product features can be used by the IPS engine. For example, a "Minimum and Maximum Age" can be used to narrow down the list of eligible products before the modeling engine is engaged. This information can be required to make the final recommended portfolio actionable. Another example is a "Minimum Investment Per Account" that can be used to narrow down the list of eligible products before the modeling engine is engaged. A "Joint/Single" feature can be applicable to annuities. The "Length of Payment Guarantee" is applicable to annuities (except for those using GMWB). Annuities can be grouped into categories by the length of the guaranteed payment period: with no guarantee (length of guaranteed payment period=0), 10-, 20-, and 30-year guarantee. Payment types can be fixed payment, index-linked, variable, COLA rate, with no COLA, etc. There are a number of other contractual features that can be considered in the context of IPS.

The IPS engine can also consider a number of qualitative product attributes. Product attributes are the features that each product has because of its unique structure and behavior, but not necessarily the characteristics that may be described in the product prospectus or contract. These qualitative features can be translated into numeric scores and placed in a database table to be handled by the modeling engine. Some examples of possible product attributes can include the following:

"Level of participant effort & sophistication to manage product" can be the degree of effort and level of investment knowledge required for the user to manage class of income products.

"Level of income amount guarantee" can describe the guaranteed income amounts for each product considered in the context of IPS.

"Level of fees and expenses" can be fees and expenses that can include, for example, trading costs due to the bid-ask spread, mutual fund management fees, trading commissions, guarantee fees, product management fees, and fees for annuities, which may include underlying fund fees.

"Volatility of Income" can be potential fluctuations of the payments.

"Volatility of Assets" can be potential fluctuations of the principal.

"Withdrawal Risk Protection" can be the ease with which the user can withdraw too much and deplete the portfolio too quickly.

Other possible product attributes can include Preservation of Principal, Inflation Protection, Longevity Protection, Potential for Income Growth, Potential for Asset Growth, Access to Principal, Inflation Protection, Longevity Protection and any other attributes that are considered important and can be translated into a relative numeric score.

Product attributes and contractual features together with the user's answers to investment preference questions are used by the modeling engine to make adjustments to the Default TIM (see below).

User Profile

To calculate its recommendations, Income Product Selector can combine user personal data (e.g., age, income need, tax rate, assets, etc.), product attributes (e.g., inflation protection, principal preservation, etc.), as well as the user's preferences for product attributes. The IPS can ask a user to input their financial and personal information. The user's financial and personal information can include demographic information, tax rates, assets by account type, monthly income, monthly expenses, additional monthly income need, asset mix, total net worth and liquid net worth.

The above-listed types of user's financial and personal information can be further broken down into specific types of information. For example, demographic information can include name, gender, date of birth, planning status (joint or single), and if the planning was done jointly with a spouse, the spouse's name, gender, and date of birth.

The modeling engine can calculate and use a tax rate supplied by the user. This rate can be supplied in various forms. In other examples, taxes can be broken down by federal effective tax rate, state effective tax rate, and local effective taxes. Other methods of estimating taxes can be used, as well.

Assets can be aggregated based on the tax type of an account. These tax types can include, but not limited to, tax-deferred accounts of the user, tax-deferred annuity accounts of the user (including cost basis for tax-deferred annuity accounts of the user), tax-free accounts of the user, tax-deferred accounts of the user, tax-deferred annuity accounts of the spouse, cost basis for tax-deferred annuity accounts of the spouse, tax-free accounts of the spouse, and joint taxable accounts.

An asset mix, or how investments are made, can be considered along with a user's total net worth and liquid net worth (used for annuity suitability calculations).

Monthly income and expenses can also be part of a users' financial and personal information. Monthly income information can be based on what part of the user's total monthly income is expected to last their entire lifetime and what part of the user's total monthly income is expected to last for a fixed number of years. The types of income typically considered for these inputs can include Social Security, pensions, existing annuity income, income from part-time work, and other income sources with or without known durations (including those that have not yet started). Users can also be asked for how many years they expect their income to continue and in some examples, part-time work can be considered as part of monthly income information. Monthly expense information can be represented by a user's essential expenses and discretionary expenses.

In some examples, an additional (also known as "bridge") monthly income need can be considered. This additional monthly income need can be income needed for a period of time, for instance, to bridge the gap until Social Security starts or for higher expense needs for any reason, for a known number of years after retirement. A number of years for which this additional income is needed can also be entered by the user.

Calculations of Income Needs and their Projections

The inputs for the calculations described below can be user responses to the above questions. The results of these calculations can be used by the Income Product Selector's modeling engine for further calculations.

The Total Tax Rate can be the total of the Federal tax rate, the state tax rate, and the local tax rate.

Essential Income Need can be the difference between total essential (e.g., basic living) expenses and after tax amount of monthly income from existing income sources.

Discretionary Income Need can be the difference between total discretionary expenses and after tax amount of monthly income from existing income sources, after essential expenses have been considered.

Additional Income Need can be entered directly.

IPS can calculate the age to which to plan and the retirement horizon for the user based on standard mortality tables, for example, the 2000 Annuity Mortality Table from the Society of Actuaries. The planning age can be calculated for both single (user only) and joint (user and spouse/partner) planning exercises. The user can be given the ability to change the planning age.

Default Target Income Mix and Adjustments for User Preferences

Figure 2:
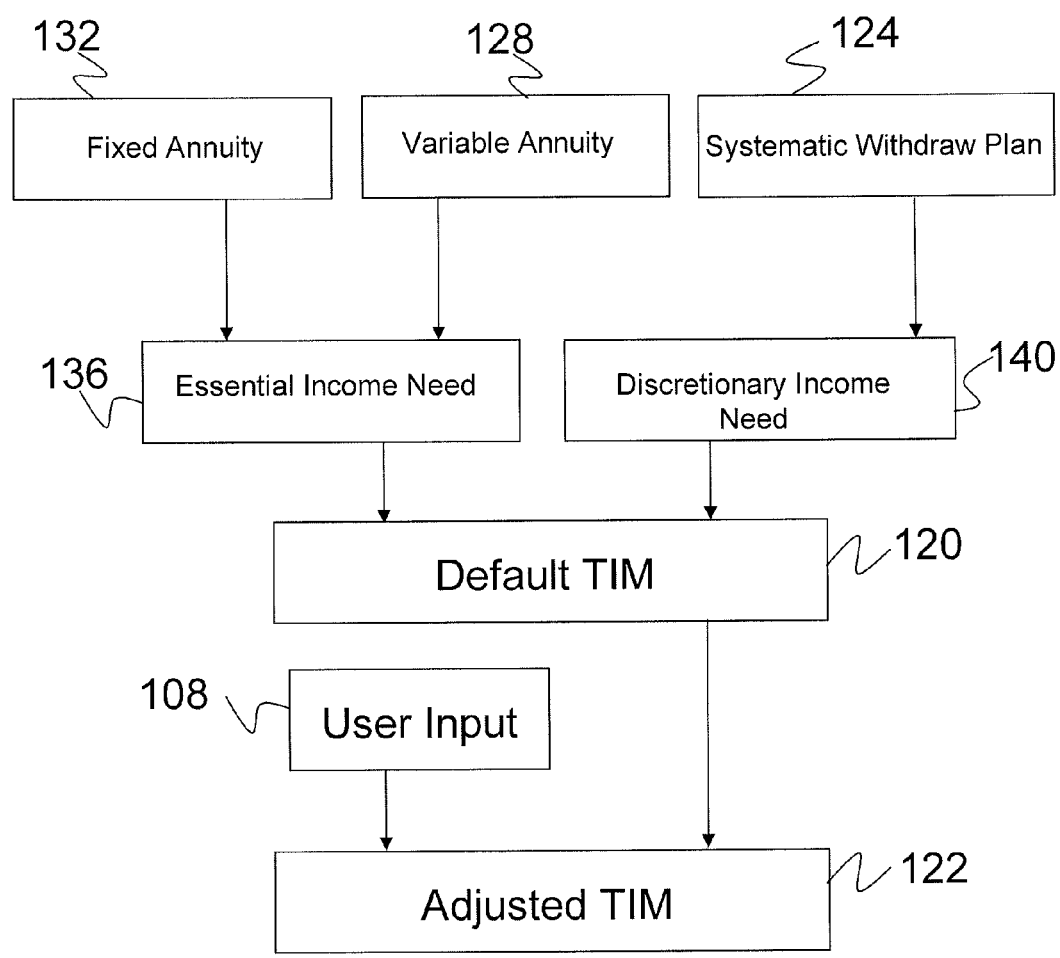
FIG. 2 is a flow diagram illustrating a process for adjusting a TIM based on user preferences.

FIG. 2 is a flow diagram illustrating a process for adjusting a TIM based on user preferences. Generally, a TIM is a high-level portfolio of three broadly defined income classes: a SWP 124, a variable annuity 128, and a fixed annuity 132. These income classes represent a subset of all financial products that can generate income. The SWP 124 class is a set of investment portfolio strategies/products that can help grow and/or appropriately draw down assets earmarked for income generation. Variable annuity 128 and fixed annuity 132 classes are sets of products that produce fully or partially guaranteed income streams in exchange for assets. The TIM can be defined by a set of percentage weights of one or more classes of income generating products and asset amounts to be invested in the one or more classes of income generating products, collectively.

The process can begin by calculating a default TIM 120 and adjusting the default TIM 120 based on user input 108 (such as preferences) to form an adjusted TIM 122. The default TIM 120 can be calculated so that an essential income need 136 can be met by guaranteed sources of income (a combination of fixed and/or variable annuities), and a discretionary income need 140 can be covered by non-guaranteed sources of income (e.g., withdrawals from an investment portfolio 124—the SWP income class). The user input 108 can include, for example, user's answers to a subset of the preference questions.

The process can be used to calculate a third target income mix to meet a third income need, which can have a fixed duration shorter than a lifetime need for the user in retirement. The third target income mix can be a third set of weights of the one or more classes of income generating products. The third target income mix can include a first percentage of assets to invest in fixed annuities and a second percentage of assets to invest in a systematic withdrawal plan to meet the third income need. The third income need can be added to the essential expenses.

The IPS portfolio construction process can begin with the calculation of a default TIM based on the user's risk tolerance (as defined by the user's chosen asset mix) and essential and discretionary income needs. By default, essential income need can be met by guaranteed sources of income where the mix of fixed and variable annuities can be determined by the user's risk tolerance, and discretionary income need can be met by non-guaranteed sources of income.

Default Target Income Mix for Lifetime Income

The percentage of total income needed to cover the essential income need can be calculated by considering the percent of monthly income needed to support essential needs. This percent of monthly income can equal monthly essential income need divided by the sum of the monthly essential income need and monthly discretionary income need.

A calculation of an allocation of income sources can be the first step on the way to computing the Default TIM weights. This allocation is calculated by funding essential income need with guaranteed income sources and discretionary income need with non-guaranteed income sources. An allocation to each annuity income class within the guaranteed income source portion of the portfolio can be determined based on the chosen asset mix.

For example, suppose monthly (after-tax) essential income needs are $1,500 per month and monthly discretionary expenses are $500 per month, meaning total income needs are $2,000 per month. The percentage of the income need can be covered with guaranteed income will then be $1,500/$2,000=75%. So, the percentage of the income coming from fixed income annuities can be 60%*75%=45% if for the user's asset mix, the initial default breakdown between fixed and variable annuities is 60%/40%. This means that in this example, 45% of essential income need will be provided by fixed annuities and 55% by variable annuities.

The allocation of income sources can be further calculated by funding discretionary income needs with non-guaranteed income sources. Discretionary income need can be funded with sustainable withdrawals from an investment portfolio with SWP (SWP income class). The percentage of income that should come from the SWP equals 100% minus the sum of fixed annuity percentage and variable annuity percentage calculated as described above.

Default TIM weights can be calculated by converting these income coverage percentages into initial asset amounts, which can in turn be used to calculate the default TIM weights. This is accomplished by calculating the asset amounts to be invested in each of one or more income classes using current annuity quotes for fixed and variable annuities. To convert SWP income into assets, the sustainable inflation-adjusted withdrawal rate that is pre-calculated for the user's retirement horizon and stated TAM can be used.

For example, if the income need is $1000, and 40% of that comes from the fixed annuity, then the assets invested in the fixed annuity should produce $400 of income. If today a fixed annuity pays $457 per $100,000 invested, then $87,527.35 should be invested in the fixed annuity to produce the required income. This process can be repeated for each of the remaining income classes, and the resulting asset amounts can be used to calculate the percentage weights of the Default TIM.

Default TIM weights can be adjusted if lifetime annuity products should be excluded because of regulatory requirements or business practices. For example, for some users, lifetime income annuities may not be suitable because of an expectation of a reduced longevity because of a serious health condition or because minimum/maximum age requirements are not met. When this situation occurs, the portfolio can be reallocated to exclude the unsuitable income products. For example, if user input indicates that he or she is not in good health, then lifetime income annuities cannot be included. In this situation, fixed income lifetime income annuities can be replaced with period-certain annuities of the duration that matches the length of the plan (through the planning age of the user). Variable annuities can also be excluded because they have no period-certain equivalent. If lifetime annuities cannot be recommended because the age requirements are not met, then the entire annuity allocation is transferred to SWP. For example, if the user is over the age of 85, life annuities can be unsuitable and only SWP can be used.

The resulting portfolio weights can be the default portfolio weights for the lifetime TIM.

Default Target Income Mix for Additional Income

The additional income need (or bridge income need) can be defined as the income needed to cover shorter-term expenses over and above the lifetime income need. The additional income need has a known and fixed duration. For example, a user may want more money to travel in the first 3 years after retiring, or the income is needed to bridge the gap to Social Security and/or a pension that may start 4 years after the time of retirement.

Additional income need can be treated as essential rather than discretionary because in many cases, this income can be used to cover shortages until other guaranteed income sources start. Fixed income annuities in this case can be represented by period-certain annuities.

Typically, period-certain annuities can be available in durations of 5 years or longer. For shorter additional income needs, a SWP from a portfolio of short-term fixed income investments can be used. The implementation can be customized to include money market funds, CDs, CD ladders, short-term bonds or bond ladders, and other short-term investment vehicles.

Adjustments to Default Target Income Mix for Lifetime Income

At the highest level, preferences for certain income class qualities (or attributes) can be used to determine which income class the user may prefer to have more or less of than what he or she may have in the default portfolio. In order to do this calculation, several tables of information can be tied together. These tables can be answers to preference questions (e.g., user input), multiplying factors for each answer (e.g., the numerical value of each answer), an adjustment value for each question, income class attribute scores for each income class, and relationships between each question and income class attributes relevant to that question.

The result of combining these tables can be a percent adjustment to the default weight of each income class. The adjustments to the weights can be either negative (a weight is reduced) or positive (a weight is increased), and the sum of the absolute value of adjustments to each income class can be normalized (e.g., scaled up or down) to equal 100%.

Preference Questionnaire

The preference questionnaire can be used to elicit user preferences for and feelings about product characteristics. The modeling engine can use the answers to the preference questions to make a series of adjustments to the default TIM. At the end of this process, the adjusted TIM can be produced.

The preference questionnaire can have as many questions as may be deemed important. Each question can be asked in any appropriate form. For example, in some embodiments, each preference question can be asked in the form of a question (e.g., "Do you need income that is guaranteed to last a lifetime?"), or in the form of a statement with which the user is invited to agree or disagree (see more examples below).

In various embodiments, the questions can be asked in the form of statements with which the user can agree or disagree using a predefined scale. For example, in some embodiments, a five-point scale can be used with the answers of "Strongly Agree"-"Agree"-"Neutral"-"Disagree"-"Strongly Disagree". In various other embodiments, a three-point scale can be used with the answers of "Agree", "Neutral", or "Disagree".

In various other embodiments, the wording of the three-point answer scale can be specific to each question, so that each pre-defined question-specific answer also contain additional information for the user to help better explain what each question is asking about.

The following is an example of a preference question with a three-point answer scale, where each answer is specific to the question and can be mapped into the Agree-Neutral-Disagree scale. Question: "How important is it to leave a financial legacy when you (and your spouse) pass away?" Answers: "Very Important" (maps to "Agree"), "I don't have a strong preference" (maps to "Neutral"), and "I'd rather get the most out of my savings" (maps to "Disagree")

In various examples, the default answer is "Neutral" and the user can change it. The answers to these questions can be used to adjust the weights in the Default TIM.

In some embodiments, the preference questions and possible responses are presented as described in Table 1. For each question, the first, second and third responses can be mapped to "Agree", "Neutral", and "Disagree", respectively.

TABLE 1

1. Are you willing to pay a fee for help managing your retirement portfolio?
    Yes - I value professional management.
    I prefer using a single fund strategy.
    No - I would rather do it myself.
2. Are you willing to accept ups and downs in asset value and/or income value in exchange for potential growth?
    Yes - I want potential for growth.
    I don't have a strong preference.
    No - stability is more important.
3. Do you need income that is guaranteed to last for a lifetime?
    Yes - I need income to last as long as I live.
    I don't have a strong preference.
    No - Not so important.
4. How important is it to you to have your income protected from market downturns?
    More important than income growth potential.
    I don't have a strong preference.
    Less important than income growth potential.
5. To get guaranteed income would you be comfortable giving up access to a portion of your assets?
    Yes - guaranteed income is more important to me.
    I don't have a strong preference.
    No - I'd rather have full access to my savings.
6. Would you call yourself a sophisticated investor with many years of experience?
    Yes - I have a lot of investing experience.
    I am not sure.
    No - not so sophisticated.
7. How important is it to leave a financial legacy when you (and your spouse) pass away?
    Very important.
    I don't have a strong preference.
    I'd rather get the most out of my savings.
8. Would you say there is a good chance you will live a long life? [Please answer for both you and your spouse if planning jointly]
    Yes - I am (we are) healthy.
    I/We don't have a good answer.
    No - probably not.

Table 1 above is an example of preference questions. In some embodiments, more preference questions are used. In other embodiments, the wording can be different. The database tables holding the information about the preference questions (including but not limited to information on the multiplying factors, TIM adjustment values, relationships between questions and attributes—see below) can be set up in such a way that any number of questions can be used. These database tables can also be set up in such a way that the order of the questions is not important, and in various embodiments, the questions can be asked in various orders.

Certain questions can be used to adjust the TIM and certain questions can be used to map income generating products into a product portfolio. For example, Table 1 can represent the order in which the preference questions can be stored in the database or the order in which questions are asked of the user in some embodiment of IPS. In this case, questions 1, 4, 7 can be used exclusively for TIM calculations, questions 2, 3, 5, 6 can be used for mapping into an appropriate product portfolio within each income class in the TIM, and question 8 can be used at both stages (see "Health question" below).

Each of the possible answers can have a corresponding multiplying factor, which represents the relative strength of the answer. In some examples, there are five possible answers to each preference question. In other examples, there are only three answers to the preference question. In these examples, the answers of "Agree" and "Disagree" can change the default TIM weights and "Neutral" makes no changes. For example, the multiplying factor for "Agree" can be 1, for "Neutral" 0, and for "Disagree" −1. The actual values for the multiplying factors can be chosen differently, as well. Each question has a TIM adjustment value, which is the percentage by which an answer to a particular question can move the weight of an income class in the TIM. For example, a question can be set to have the overall possible impact on the TIM weights of 20%. These values can be pre-determined for each preference question and stored in a database table.

For each income class, any number of attributes can be considered. For each income class, a numerical score can be assigned to each of those attributes. The scores can range from "worst" to "best" that are represented by any convenient numerical values (for example, −1 and 1, respectively), with degrees of conformity anywhere in between. Scores for each attribute are relative across income classes. The scores can be pre-determined and stored in a database table. The last table in the calculation can describe the relationship between the questions and attributes. This table can help explain what attributes are considered by each preference question. Each question can relate to one or more attributes. If the question relates to only one attribute, then the entire numerical value of the answer applies to that attribute. If a question relates to several attributes, a percentage of the numerical value of the answer can affect each of those attributes. These percentages can be positive or negative, and the sum of their absolute values can be equal to 100%.

For example, the question "I am willing to accept ups and downs in asset and/or income value in exchange for potential growth" relates to the following attributes: income growth potential, asset growth potential, volatility of income, and volatility of assets. More growth (either in income or assets) usually comes with more volatility—so growth is "good," whereas volatility is "bad." Therefore, the weights of the two volatility attributes can be negative, and those of the growth attribute can be positive. For example, they can be equally weighted with each of the four attributes getting a weight of 25% in absolute value (i.e., opportunity for growth of assets and income can each have a 25% weight, and the weight of volatility of income and volatility of assets can be −25% each).

As an example, consider a user with a default TIM of 20% variable annuity, 30% fixed annuity, and 50% SWP, and a balanced asset mix of 50% stocks, 40% bonds, and 10% short-term investments. In this example, the numerical value of the "Strongly Agree" answer can be 1, and the maximum percentage by which this question can move the weight of the income classes in the TIM can be 10%. If the user gave the "Strongly Agree" response to this question, the TIM weights can move by 10%, which is the product of the numerical value of "Strongly Agree" and max TIM adjustment of 10% for this question.

As described above, the preference question in this example can relate to four attributes: potential for income growth, potential for asset growth, volatility of income, and volatility of assets. In this example, the weights of these attributes can be 25%, 25%, −25%, and −25%, respectively. Each of the four attributes can be assigned a numerical score to describe each income class based on its behavior. In some embodiments, these scores can range from −1 to 1 (worst to best), or any other range can be used as long as the remaining calculations of the Default TIM adjustments are internally consistent.

Based on the weights of the four attributes and their numerical scores, an adjustment to the weight of an income class in the Default TIM can be calculated. For example, for the Fixed Annuity income class, the numerical score for the four attributes can be 0.1, −1, 1, and 1 for the potential for income growth, potential for asset growth, volatility of income, and volatility of assets attributes, respectively. These weights can be determined based on the behavior of each income class. For example, annuities involve an exchange of assets (a lump sum of money) for a stream of income payments that are guaranteed to continue for the life of the investor. Therefore, for example, the potential for asset growth can get the score of −1 (worst, there are no assets left after an annuity is purchased), and volatility of income can get a score of 1 (best) because the income from a fixed annuity does not fluctuate over time.

In this example, the weight of the fixed annuity can be adjusted by:

$$0.1*0.25+(-1)*0.025+1*(-0.25)+1*(-0.25)=-0.725\%.$$

The process of calculating default TIM adjustments for the remaining income classes (SWP and Variable Annuity) can be the same. In this example, suppose the adjustments for the SWP and Variable Annuity income classes are calculated to be 0.25 and 0.175, respectively.

The sum of the absolute values of these adjustments is 1.15. The adjustments can be normalized (scaled up or down) so that the sum of their absolute values can be equal to 1, which can ensure that the weights of the income classes are collectively adjusted by 10%. In this example, the normalized weights of the income classes can be adjusted by approximately 2.2% for the SWP, −6.3% for the fixed annuity and 1.5 for the variable annuity.

Note that the values shown above are rounded for readability. In the actual calculations, rounding of these values need not occur. The sign of each adjustment shows the direction of the adjustment. The scores for each attribute can be reasonable for each income class relative to the other two, and the weight of each attribute that relates to each preference question can be reasonable, such that when multiplied by the scores, the weighted sum of the scores is equal to 100%. The normalization calculation at the end of this process can be used for each question since there is no precise adjustment. The adjustments for TIM weights can be summed to 100%.

The above process can be repeated for each question, and the resulting adjustments for each income class can be added to the corresponding default TIM weights. At the end of this process, the adjusted TIM weights can end up not summing to 100%. Therefore, the process can be ended by normalizing the final weights. To normalize, weights can be scaled up or down so that their sum equals 100% and rounded to the nearest 10%. These weights can be the TIM weights before annuity suitability is applied and purchases of income classes can be calculated using the user's account values.

The calculation of the adjusted TIM described above can support any number of preference questions, any number of attributes, and any number of possible answers to each preference question.

Different preference questions can be used at different stages in the calculations. For example, the questions "Would you call yourself a sophisticated investor with many years of investing experience?" can be used to adjust the weights of the Default TIM. In another example, the question "Would you like your investments to be professionally managed for you?" can help determine the product model for the SWP income class that may be appropriate for the user. In yet another example, the question "Would you say there is a good chance you will live a long life" can be used to both construct the income product portfolio and help meet certain suitability requirements.

In various embodiments, one or more of the preference questions can ask about the state of the user's health. For example, see "Would you say there is a good chance you will live a long life" in Table 1 above). The answer to this question can be processed differently from the rest of preference questions. If the user states that he or she is not in good health, the composition of the TIM can change. In this example, a life annuity cannot be sold to the user, and it can be replaced with a period-certain annuity that pays income for duration of the user's entire retirement (the length of retirement can be user-supplied). Variable annuities can be avoided altogether as they have no period-certain equivalent. This question can be used both for annuity suitability and to map the fixed annuity income class to the appropriate fixed income annuity option.

In some examples, a programmatic solution can be used to replace the health question. For example, the user can be presented with planning ages for the user and spouse if planning jointly, or just for the user for a single plan. The planning age(s) can be calculated based on any appropriate mortality distribution. If the user makes no changes to the planning age(s), then it can be assumed that the user (and spouse if planning jointly) is in good health. The system need not ask the health question directly. If the user changes the planning age (for a single plan) or both planning ages for a joint plan to a pre-determined number of years below the median of the mortality distribution (the "average" life expectancy), then this can be an indication that the user may have a health problem. Then the health question can be asked directly. If the user does not have a health problem, but changed the values because planning into their 90's seemed unrealistic, the user can be educated on planning conservatively to make sure the user does not outlive his or her savings.

The health question can be worded to address "joint" health situations (e.g., both the user and the spouse are either in good health or not). If the user is in good health and expects to live for a long time, but the spouse has a health problem, then instead of planning jointly, the users can be advised to create two single plans.

Income Solver: Calculations of Asset Purchases and Final TIM Weights

Figure 3:
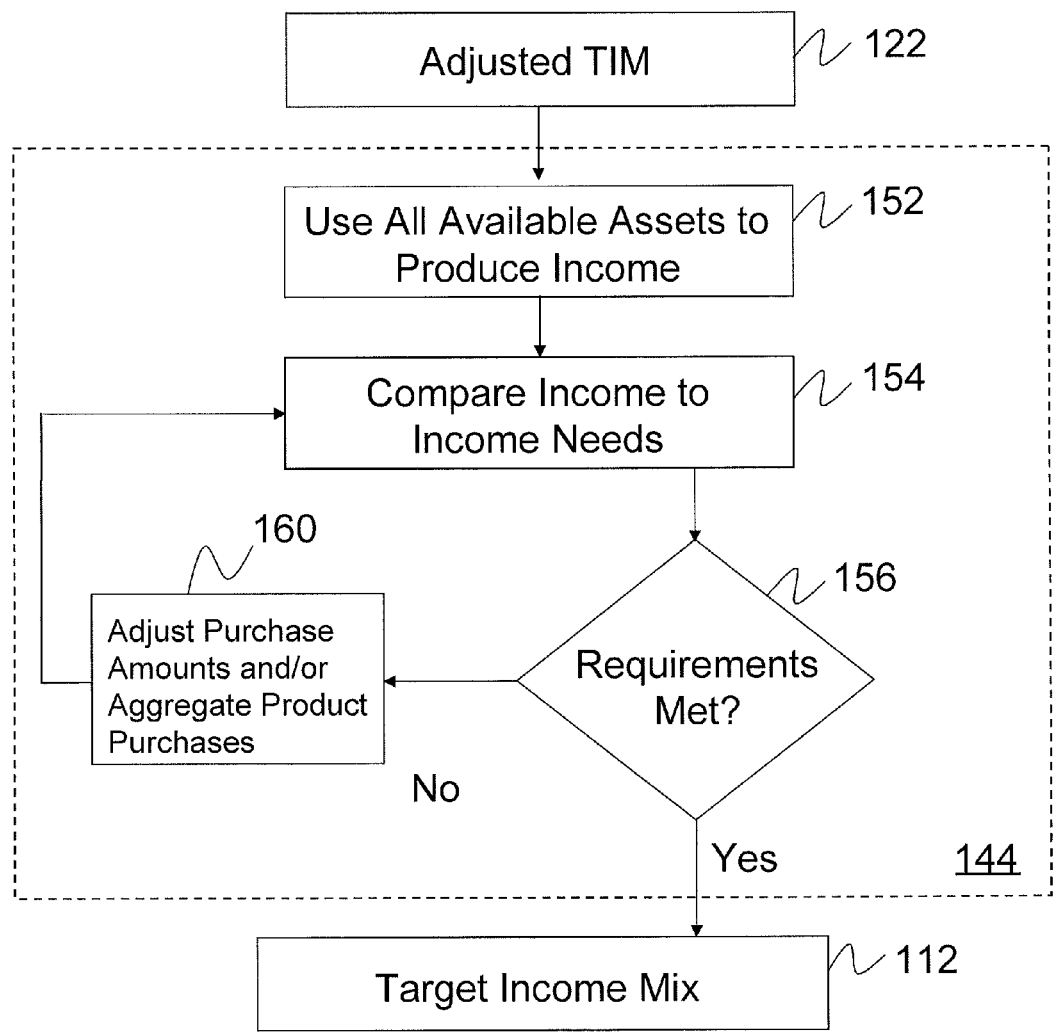
FIG. 3 is a flow diagram illustrating a solver for calculating the composition and asset amounts of the final TIM.

FIG. 3 is a block diagram illustrating an example of a process to determine the composition of and assets to be invested in a target income mix 112 using an adjusted TIM 122. The solver 144 can purchase each income class from the user's accounts using all available assets (152). The initial purchase amounts are subjected to a comparison step 154, determining if legal, regulatory and minimum investment requirements and if income needs are met (156). If the requirements are met, the target income mix 112 is determined. The dollar amounts of the target income mix 112, as well as income and asset projections, can be displayed to the user for review. If the requirements are not met, the purchase amounts can be adjusted and/or aggregated (160), and the process can be repeated. The initial purchase amount can meet both the essential expenses and the discretionary expenses at certain confidence levels.

If the user has an additional income need for a fixed number of years, the solver can first attempt to solve for the lifetime income need. If assets remain after that solution has been found, the solver can use a similar procedure to calculate the solution for the additional income need using the remaining assets.

In various examples, the solver can be used to adjust the asset amounts needed for product purchases until the user's essential income gap can be covered at the 0% return and total (essential and discretionary) income gap is covered at the 50% confidence level. The solver can be used without modifications using the entire available assets initially, or it can be modified to use the total amount of assets required for the TIM as the starting point IPS process can determine what portion of the client's total assets could be invested in the TIM that resulted from the default TIM adjusted for the stated preferences. As described above, the adjusted TIM can be represented by percent weights for each income class. The process can use the adjusted TIM to determine the final TIM that can be implemented. The final TIM can be a combination of percent weights for each income class and suggested purchase amounts for the income classes given the assets available to the user. Certain constraints are accounted for, such as: lifetime annuity limit as a percent of total liquid net worth (for example, no more than 50% of the user's liquid net worth can be used for purchasing a life annuity), period-certain annuity limit as a percent of total assets (for example, no more than 25% of the user's liquid net worth can be used for purchasing a period-certain annuity), minimum investment amounts for each product (for example, the minimum investment for a lifetime fixed income annuity can be $10,000) and subsequent rules if the minimum is not met, as well as different tax treatments of product purchases funded from different account types.

The output from the solver can be the dollar amount that can be invested in each income class using specific types of accounts to fund the purchases. These dollar amounts can be reported on a pretax basis to make it easier for the user to implement or in some cases they can be reported on an after-tax basis if the use of particular account types for purchases of particular products involves a taxable liquidation. For example, tax-deferred annuity accounts allow for tax-deferred growth of assets as long as the assets are converted to an income annuity at a pre-specified later date. The investor, however, has an option of taking the investments out of that account and using them for other purposes than buying an income annuity. In that case, the asset amount being withdrawn from the tax-deferred annuity account is taxed, and a lower asset amount can be available for investment elsewhere. In examples such as this, the assets taken out of the account can be shown on the pre-tax basis, but assets purchasing an investment product (and producing income) can be shown on the after-tax basis. Both views can be useful to the user. The unused assets (e.g., assets that are left over after the income portfolio has been created) can be tracked and reported in the results.

The main goal of the solver can be to solve for the asset amount needed to generate the required income amount for the lifetime income need, and then for the additional income need, if any. The solver can work with projected income needs (e.g., essential, discretionary, and total income needs), as well as projected income amounts paid by each income class.

To project the user's income needs, in some embodiments, the process can use the current income need information provided by the user and increase it every year at an expected rate of inflation.

In other embodiments, it may be easier for the user to provide actual expenses that he or she expects to have over the course of retirement. These expenses can stay constant or vary over time. A "leveling" process can be used to convert variable income and expenses to representative values for income, essential expenses and discretionary expenses to be directed to the modeling engine. Leveling can support any number of potential typical budget line items that can help a user create a budget for retirement. Examples can include (and not limited to) cost of food, cost of medical insurance, cost of transportation, living expenses, vacations, charitable giving, gifts to grandchildren, income from existing annuities, pension, etc.

To calculate net expenses and income, the following can be accounted for: subtract the total expense amount for each period within the household retirement duration from the total income amount for the same period, subtract the essential expense amount for each period within the household retirement duration from the guaranteed income amount for the same period, and subtract the discretionary expense amount for each period within the household retirement duration from the non-guaranteed income amount for the same period. The period can be the time frequency that the modeling engine can support (typically, monthly, annual, etc.).

Based on these calculated values, the leveling process can calculate a number of statistical measures of the income and expenses over time to determine values to represent the income and expenses to be used by the modeling engine, as well as assess the variability, skewness, kurtosis, and range of the distribution. The mean values can represent the income and expenses. The remaining measures can be used to assess the viability of the retirement plan. It can be determined that the user's income needs are highly variable (i.e., high standard deviation and/or widely ranging income needs in any given period), skewed or exhibit a high degree of kurtosis (e.g., a stream of relatively constant values that can have high peaks every so often. For example, the user states that she needs income of $2,000 a month for the next 20 years, but in April of year 5 she will need $15,000, and in December of year 19 she will need $40,000. This stream of income values will have high kurtosis). In cases where any of these measures are found significant by the modeling engine (i.e. greater than a pre-defined tolerance level), the user can be notified to revisit the budget entries for income and expenses to make sure that the income stream from the retirement income portfolio can adequately cover his or her income needs. For example, a tolerance level of 30% variability can be used to differentiate low variability income needs from moderate variability income needs; and another tolerance level of 60% can be used to distinguish highly variable income needs (with variability above 60%). The messaging can be accomplished in a variety of ways; in some embodiments, a pop-up warning or an email message can be used.

To project the income amounts that each income class can pay in the future, the payment behavior of each income class can be modeled based on the rules that can be specified in the product's prospectus. For example, the income from a variable income annuity can be calculated using a formula that is based on three factors: initial quote (typically calculated by the issuing insurer), the return of the underlying portfolio in a given period of time, and the benchmark rate (see a description of variable income annuities above). This formula can be applied to a unit of assets (for example, $1,000 invested) starting in the first year of the contract and ending at the end of the retirement horizon. This formula can use Monte-Carlo simulated returns at any confidence level (see a description of Monte-Carlo simulations and confidence levels above) to produce income projections in particular market conditions (which can be represented by confidence levels). The income projections can be calculated at the pre-tax and after-tax basis. Income projections for fixed income annuities, period-certain annuities and SWP classes of income products can be calculated in a similar fashion by applying product-specific rules that determine income payments.

The IPS can attempt to purchase each income class from the user's accounts using an income class purchase priority list, account purchase priority list (see below) and by taking into account annuity suitability rules, income class minimum investment amounts, rules of taxation for different types of accounts and rounding requirements.

If the user has an additional income need for a fixed number of years, the solver can first attempt to solve for the lifetime income need. If assets remain after that solution has been found, the solver can use a similar procedure to calculate the solution for the additional income need using the remaining assets.

In the first iteration of the solver for the lifetime income need, all available assets can be used. In the first iteration of the solver for the additional income need, all assets remaining after solving for the lifetime income need can be used.

The total amount of income generated by the TIM assets at each iteration of the IPS solver can be calculated by multiplying each asset amount by the income amount per unit investment amount (for example, $1000 invested) that each income class is projected to produce and dividing the result by that unit amount. For example, if a product produces $40 in income per $1,000 invested and $200,000 are invested in this product, then the total amount of after-tax income produced will be $200,000*$40/$1,000, or $8,000.

To allow for an efficient purchase process given income class minimums ranging from $0 to $25,000, an income class purchase order can be set. This purchase order can be defined based on the investment amount that is required to meet the minimum; this can allow income classes and products that have the highest minimum investment amount requirements to have a chance to be purchased first. One example may be to instruct the solver to begin purchases for lifetime income need with the variable annuity income class (a representative minimum investment amount of $25,000), then fixed annuity income class (a representative minimum investment amount of $10,000), and ending with the SWP income class. The procedure can purchase one product at a time. Income classes can be cycled through in order of the purchase order. Each income class can be checked for whether there is a positive weighting for it in the TIM. If so, the purchase order can be checked in a database table.

If the income class cannot meet the purchase minimum, the purchase order can allow a transfer of assets to a different income class. For example, if a variable annuity cannot be purchased, the purchase amount can be transferred to the SWP income class. The minimum purchase amount for the SWP income class can be set to $0 because this minimum investment amount is typically low and can be different based on the account type from which SWP can be purchased. This purchase order can also be defined in a number of other ways to produce a reasonable solution.

Each income class can have a funding priority for each account type. This can be done to improve the tax efficiency of the final solution. For example, if an annuity is to be purchased, then the procedure can check if tax-deferred annuity assets are available (and if so, using them to suggest a purchase) first, followed by tax-deferred accounts, then taxable accounts, and tax-free (Roth-type) accounts last. A reasonable order of purchases for a SWP can be taxable, tax-deferred, tax-free accounts, and tax-deferred annuities last. The same purchase order can apply to both lifetime and additional income needs. Table 2 shows an example of such a priority order:

TABLE 2

| Income Class | Purchase Order Lifetime | Min Investment | Priority Taxable | Priority Tax Deferred | Priority Tax Free | Priority Tax Deferred Annuity |
|---|---|---|---|---|---|---|
| ANNUITY VARIABLE | 1 | $25,000 | 3 | 2 | 4 | 1 |
| ANNUITY FIXED | 2 | $10,000 | 3 | 2 | 4 | 1 |
| SWP | 3 | $0 | 1 | 2 | 3 | 4 |

Given the different tax treatment of each account, the procedure can follow different rules depending on which account the funds are being drawn from. If the funds are drawn from a deferred annuity account and are being invested into a SWP income class, then the IPS can first check whether there is enough after-tax money available in that account to meet the SWP minimum. For example, an investor can be required to use assets from the tax-deferred annuity account, be able to pay the taxes associated with the withdrawal, and be able to purchase the product from a taxable account before she is allowed to purchase a non-annuity product. The withdrawal can be taxed proportionally based on the total basis and market value of the account. Tax deferred annuities can be taxed only on the gains in the account. For example, if 70% of the account value is the basis, then all withdrawals of assets can be subject to income tax on the gains, or 30% of the total withdrawal. In cases where asset withdrawals occur, the amount needed to withdraw from the tax-deferred annuity account can be greater than the amount invested into the product. If there is enough money to fund the purchase, the procedure can check the actual amount suggested for purchase. The adjusted TIM can be based on percent allocations, so in some cases when the percent allocation can be transformed to an actual dollar value, it can be under the income class purchase minimum. A tolerance level can be applied to this constraint so as to not prevent purchases for impractical reasons. Or such reason can be being one dollar short of the minimum investment. In the case when the amount to purchase is greater than the minimum investment required, the system can proceed. If the amount to purchase is less than the minimum investment, then the system can proceed without purchasing the income class or a portion of it. Finally, if the amount to purchase is less than the minimum but within a set tolerance level then the purchase amount can be changed to equal the product minimum. For example, if the purchase amount is equal to $24,900 and the product purchase minimum is $25,000 then the purchase amount can be set to $25,000.

The projected after-tax income from the TIM can be compared with the essential income need and total income need in the evaluation year. In some examples, the evaluation year can be the mid-point of retirement or the mid-point of the additional income period if any. Essential income need can be compared with the income produced at the first pre-determined confidence level or return assumption, and total (essential plus discretionary) income need can be compared with the income produced at the second pre-determined confidence level or return assumption. In some examples, essential income need can be met at the 0% return assumption and total (essential plus discretionary) income need can be met at the 50% confidence level. One solving criterion can be defined as the total after-tax income at the first pre-determined confidence level or return assumption in the evaluation year can be greater than or equal to the essential projected income need. Another solving criterion can be defined as the total after-tax income at the second pre-determined confidence level or return assumption in the evaluation year can be greater than or equal to the projected total income need. If the income need cannot be met on the first iteration (e.g., when the solver can use all available assets), the tool can stop the calculations and project the appropriate partial income portfolio with all of the assets used to show the potential income that the portfolio may generate. If there is enough income to meet the essential need, but not enough income to meet the total income need, then a different kind of partial solution can be presented to the user. These results can allow the user to make a more informed decision as to how and whether he or she may want to adjust the income portfolio, retirement date, or lifestyle based on the results.

At the first iteration, 100% of assets can be the upper bound and the lower bound can be 0% of assets. The percent of assets used in each iteration is called the "purchase multiplier." The solving procedure described above can "squeeze" the bounds closer together so that when the bounds are very close to each other, the solution can be found. This optimization method is called bisection (since the process constantly divides intervals in half to squeeze the asset bounds) and can be used to find solutions to highly non-linear problems where other methods do not work.

In the case that 100% of the portfolio is more than sufficient to meet the solving criteria; the IPS can narrow down a value for the purchase multiplier that can meet the criteria within a certain tolerance level. After the first iteration, the bounds of the multiplier are still 0% and 100%. The bounds can be reset based on the value of the purchase multiplier and whether there is enough income generated or not. If there is enough income generated, the upper bound is set to the current value of the multiplier. This can mean that there is no reason to try multipliers higher than the current value because it is already known that all multipliers above the current value can generate enough income. If on the other hand there is not enough income, the upper bound is kept equal to its previous value but the lower bound is now set to the value of the multiplier. This is because multiplier values below the current can still generate too little income to meet the criteria. Once the values of the bounds are reset, the multiplier itself can be reset to equal to the average of the sum of the upper bound and the lower bound.

For example, after iteration 1, the upper bound can be 100% and lower bound can be 0%. If enough income is generated then the upper bound can be reset. In this case, it can still be set to 100% because that was the value of the multiplier. The multiplier is then reset to equal 50% (e.g., (100%+0%)/2=50%). The solver can then run the income projections with the 50% multiplier (i.e., half the available assets). If there was too little income generated, the lower bound can be reset to the value of the multiplier, which is 50%. The multiplier in the third iteration can then be 75% (e.g., (100%+50%)/2=75%). This process can be repeated at every iteration. The procedure stops iterating when the difference between the upper bound and the lower bound is less than or equal to the tolerance level and no additional benefit can be derived from continuing to solve. The tolerance level can be set to 0.01%.

The process can iterate until the income is matched or the bounds are squeezed so tightly together that there is no benefit to continuing. The IPS can also stop if it has gone though the allowed number of iterations. In some examples, the maximum number of iterations can be 25, but typically, fewer can be required to find a solution. Another stopping condition can be implemented where the modeling engine stops if the income is within some dollar amount from the target amount, thereby reducing the number of iterations and speeding up the process. For example, this amount can be set at a $5 maximum difference in monthly income amount between the target and the result of the solver.

This logic can be identical for the additional income need calculations. In the additional income need period, all of the income need can be considered essential. The solving criteria for the additional income need can be to meet the first income need and the third income need (i.e., essential and additional income needs), collectively, at the first predefined confidence level or return assumption and to match the first income need, the second income need, and the third income need (i.e., essential, discretionary, and additional income needs), collectively, at the second predetermined confidence level or return assumption. For example, the modeling engine can use the 0% return assumption and the 50% confidence level, respectively. Differences for the calculations of an additional income TIM can include using the income for period certain annuities to represent fixed annuities, excluding variable income annuities and starting the IPS process with assets remaining after the purchase of lifetime, if any. The evaluation year for the additional income need period can be the midpoint of the additional income need time horizon.

The IPS can incorporate annuity suitability rules related to purchase amounts, such as limits on purchases of lifetime annuities and period-certain annuities. For example, purchases of lifetime annuities cannot exceed 50% of liquid net worth and purchases of period-certain annuities cannot exceed 25% of liquid net worth. IPS can use the liquid net worth as reported by the user to evaluate whether the result is suitable or not. For example, if a user has reported $1,500,000 in liquid net worth, if the annuity limit is 50% of assets, then the annuitization limit can be any combination of assets summing to $750,000. Business rules such as these can apply to other types of assets. For instance, in some examples, these limits can apply to total investable assets or total assets earmarked for producing retirement income.

If the period-certain annuity purchase as a percent of liquid net worth exceeds 25%, the percent can be decreased to 25%. The excess purchase percent can be added to the SWP income class. Similarly, if the sum of the purchase amounts for variable annuity and fixed annuity exceeds 50%, then each product purchase amount can be reduced pro-rata and the excess can be added to the SWP income class. This rule can apply the same way to the income class purchase solver for the additional income need period. The annuity investments made during the lifetime income solving can be tracked and solution for the additional income need can be constrained to make sure that total annuity purchases do not exceed the limit. For example, if the lifetime solver has already exceeded the maximum annuity limit, then investing in annuities for the additional income need period cannot be allowed, and annuities can be excluded from the solution.

One reason for a separate suitability limit for period-certain annuities is to ensure that users do not over-annuitize their assets (this is a common industry concern). It can be desirable for users to have their lifetime income needs met first and only then can it be appropriate to determine whether or not additional income needs can be covered.

Once IPS checks the asset amounts allocated to each income class for annuity suitability, these amounts can be rounded so that the weights of the TIM that these amounts represent are rounded to the nearest 10%. Purchased annuities can be rounded first. The remainder of the assets required for the entire portfolio can then be reallocated to SWP. At this stage in the process, there can be situations where the amount allocated to the variable annuity income class may exceed the amount allocated to fixed annuities. In this case, the weight of the variable annuities in the TIM can also exceed the weight of the fixed annuities. Since lifetime income annuities can be used to meet the essential income need, fixed annuities can carry at least an equal weight to the variable annuities in the TIM. For this reason, the existence of the essential income need can be checked, and if it exists, the variable annuity can be rounded down and fixed annuity can be rounded up. In some examples, this can ensure that there cannot be any TIMs where the weight of the variable annuities can be greater than that of the fixed.

In some cases, the user might have only discretionary expenses, with all the essential expenses covered by existing lifetime income sources. The user can still answer the preference questions in such a way that annuities can be recommended. In some examples, the IPS cannot prevent annuities from being part of the TIM. In such cases, the IPS can allow the weight of the variable annuities to exceed the weight of the fixed annuities.

Once it can be established that the minimum investment is met, the system can proceed in one of two ways. In the case where the purchase amount and any associated taxes are less than the amount available in the account type, the system can determine how much of the account to liquidate to cover the appropriate purchase amount as well as associated taxes (in the case where a SWP product is purchased using tax-deferred annuity assets). If the account does not have the funds to cover the purchase amount and the taxes, then the system can liquidate the entire account. The post tax value of the account can be determined and subtracted from the purchase amount. The remaining purchase amount can be covered by another account type as the procedure cycles through all account types until the purchase amount can be met.

IPS can attempt to fund an annuity product from a tax-deferred annuity account first, before other account types can be considered. The tax treatment of the product purchases can differ when an annuity product is funded from a tax deferred annuity account. When purchasing an income annuity from a tax deferred annuity account, there is no taxable event. The tax can be assessed on income rather than upon investment, and the asset amount suggested for withdrawal can be equal to the amount invested into the product to generate income. This logic can be used for all purchases other than when an investment product is purchased using assets in a tax-deferred annuity account. In all other cases, no tax can be assessed upon investment. For tax deferred accounts, the products can be purchased in an IRA tax free and tax can be assessed when income is generated. Taxable accounts can be assumed to have cost basis equal to market value at initial purchase, meaning that withdrawing money or liquidating assets does not cause a taxable event. Based on these assumptions, when purchases are made using assets in a taxable account, no tax can be assessed upon purchase but taxes going forward and upon liquidation for income can be assessed. The IPS engine can track account activity as different income classes or products are purchased from the same account type.

Once the solving procedure reaches an iteration where the solving conditions can be met, the final TIM can be represented by a set of income class weights and a list of asset purchases from particular account types associated with each income class weight.

The final TIM can be presented to the user in a variety of ways. In some embodiments, the weights of the income classes and the corresponding asset purchases can be reported. In other embodiments, asset purchases can be reported. Projected income needs, income for each income class in the TIM, assets that may be associated with the TIM investments, remaining assets can be reported to the user in a graphical form and/or a tabular form.

Mapping the TIM to a Product Model Portfolio

Once the TIM has been calculated (e.g., the weights and assets invested into each income class to meet the user's income need are known), each income class can be mapped to a product model portfolio using the user's answers to preference questions.

The product models can be organized in a database table and represented by positive weights that can sum up to 100% within each corresponding income class. For each income class, the weights for product models can be retrieved from this database table and multiplied by the weight of that income class in the TIM. The resulting weights can then be multiplied by the asset amounts used to invest in each income class, resulting in the initial product portfolio that can be ready to be used by the IPS modeling engine.

Each combination of answers to the preference questions used for mapping the TIM to product models can be mapped to a particular product model. For example, consider the preference question "Are you willing to pay a fee for help managing your retirement portfolio?" (question 1 in Table 1 above). In some embodiments, this question can have three answers: "Yes—I value professional management", "I prefer using a single fund strategy", and "No—I would rather do it myself". This question can determine the appropriate model to map the SWP income class in the TIM. If the user chooses the first answer, the model portfolio offered can be 100% Managed Accounts. The second answer can map the SWP income class to 100% Single Fund Solution, and the third can suggest 100% Self-Managed SWP. Models for the Variable Annuity income class can include the following models: 100% Variable Income Annuity, 50% Variable Income Annuity/50% VA with GMWB, 100% VA with GMWB. Fixed Annuity income class can be mapped into 100% Fixed Income Annuity or 100% Period-Certain Annuity. The product models can be based on any number of products available to implement the suggested solution and need not be limited to those described above.

Additional limitations can apply to certain products based on their design. For example, the Variable Annuity with GMWB can often have the provision that if the withdrawals are taken before the youngest annuitant in a joint policy or the single policyholder reached the age of 60, the asset value of the product can be eroded. Since IPS can be designed to provide solutions where the income payments begin right away, it can be desirable to avoid this situation and recommend GMWB only when it is appropriate (e.g. the annuitant is at least 60 years of age). If the user answers the preference questions in such a way that GMWB is recommended, but they are younger than 60, then his or her answers to the preference questions can be ignored and the user can receive a 100% variable annuity product model.

For example, after entering financial information and answering preference questions, a user can receive the following TIM:

TABLE 3

| | Final TIM | After-Tax Purchase Amounts |
|---|---|---|
| Variable Annuity | 10% | $92,836 |
| Fixed Annuity | 40% | $371,345 |
| SWP | 50% | $464,182 |
| | | $928,363 |

Let's assume that the user has given such answers to the preference questions that the TIM can be mapped into the following product models:

TABLE 4

| Income Class | Product | Variable Annuity Model Portfolio | Fixed Annuity Model Portfolio | SWP Model Portfolio |
|---|---|---|---|---|
| VARIABLE ANNUITY | VARIABLE ANNUITY | 50% | | |
| VARIABLE ANNUITY | GMWB | 50% | | |
| FIXED ANNUITY | FIXED ANNUITY | | 100% | |
| SWP | SWP | | | 100% |

To convert these product models into the complete product portfolio for this user, the income class weights in the TIM can be multiplied by the percentages in the models. Table 5 shows the results:

TABLE 5

| Income Class | Product | Portfolio Weight Before Aggregation | After-tax Amount Purchased Before Aggregation |
|---|---|---|---|
| VARIABLE ANNUITY | VARIABLE ANNUITY | 5% | $46,418 |
| VARIABLE ANNUITY | GMWB | 5% | $46,418 |
| FIXED ANNUITY | FIXED ANNUITY | 40% | $371,345 |
| SWP | SWP | 50% | $464,182 |
| | | | $928,363 |

This result is an exact representation of the TIM using a product model. This is not the final result because it will not be known immediately whether all of the products can be purchased and whether the dollar investments above can produce the required amount of income.

Income Solver: Calculations of Product Purchases

FIG. 4 is a block diagram illustrating an example of a process to determine the composition of and assets of the product portfolio 116. Product models 164, a TIM 168, and information about user accounts and assets (e.g., information contained in the user input 108) are received to determine initial asset purchase and income amounts 172. The solver 144 can purchase each income class from the user's accounts using all available assets. The initial purchase amounts are subjected to a comparison step 154, determining if legal, regulatory and minimum investment requirements and if income needs are met (156). If the requirements are met, the product portfolio is determined (116). The dollar amounts for the product model portfolio, as well as income and asset projections, can be displayed to the user for review. If the requirements are not met, the purchase amounts can be adjusted and/or aggregated (160), and the process can be repeated. The initial purchase amount can meet both the essential expenses and the discretionary expenses at certain confidence levels. The process can repeat itself until the income needs are met.

At the product model level, IPS can determine the portion of the client's total assets to be invested in the product models that the user can be "mapped" into based on his or her answers to the preference questions.

At the TIM level, each income class can represent a class of individual income products that can have certain features in common. In some embodiments, the models for the SWP income class can be represented by 100% Managed Accounts, 100% Single Fund Solution, and 100% Self-Managed SWP. In some embodiments, models for the Variable Annuity income class can include the following models: 100% Variable Income Annuity, 50% Variable Income Annuity/50% VA with GMWB, 100% VA with GMWB. Fixed Annuity income class can be mapped into 100% Fixed Income Annuity or 100% Period-Certain Annuity. The product models can be based on any number of products available to implement the suggested solution and need not be limited to those described above.

At the product model level, the IPS can determine the appropriate product models that can be purchased to represent each income class based on the user's preferences. This part of the process can have two stages: (1) mapping into a product model portfolio based on preferences and (2) solving for dollar purchases so that the user's income needs are met. There can be a number of practical issues to overcome when transforming that portfolio into something that can be implemented by the client. Constraints can be life time annuity suitability limit as a percent of a measure of total assets (for example, liquid net worth can be used as such a measure), period certain annuity suitability limit as a percent of a measure of total assets (for example, liquid net worth can be used), minimum investments for each product and subsequent rules if the minimum is not met, as well as the tax treatment of each purchasing account type.

The output from this part of the process can be the amounts that can be invested in the specific products in specific account types. This can be reported on a pretax basis or an after-tax basis as needed to make it easier for the user to implement. The unused assets can also be tracked and reported in the results.

Similar to the TIM Solver, the main goal of the solver can be to solve for the asset amount needed to generate the required income amount for the lifetime income need, and then for the additional income need, if any. The solver can work with projected income needs (e.g., essential, discretionary, and total income needs), as well as projected income amounts paid by each income class.

The second solver can be needed because actual products can produce a different amount of projected income than their representative income class at the TIM level. For example, the VA with GMWB can produces significantly different income payments from the Variable Income Annuity, which can both represent the Variable Annuity income class and be part of a product model portfolio. As a result, after the initial mapping of the TIM to a product model, this initial product portfolio can produce more or less income than needed.

The process can work as follows. First, the solver can start with the user's TIM and use dollar amounts earmarked for each income class. As described in the example above, the solver can use answers to preference questions to map each income class into an appropriate model. In some examples, there can be three models for the variable annuity income class, two models for fixed annuity income class and three models for the SWP income class. The solver determines dollar amounts for each product based on the model portfolio allocation to each product and the amount of purchase at the TIM level, as well as check investment minimums and aggregate purchases if minimums are not met After this initial determination, the solver can attempt to purchase each product from the user's accounts using the product purchase priority list, account purchase priority list and taking into account annuity suitability rules and product minimums. This process can be very similar to the solving procedure used to solve for the TIM. The solver can use the amount of assets required to purchase the TIM as the starting point at the product model level (instead of all available assets at the TIM level). The solver can also calculate the income that this purchase of the product model can produce to see if the income need is met (for both lifetime and additional income needs). The income in the evaluation year can be used in this comparison. The evaluation year can be the mid-point of the retirement horizon for lifetime income needs, and/or the mid-point of the additional income need horizon.

The total amount of income generated by the product purchase amounts at each iteration of the solver can be calculated by multiplying each asset amount by the income amount per unit of investment (for example, $1000) in each product and divided by the unit investment. Depending on the tax status of the funding account from which product purchases are made, either pre-tax or after-tax income per unit of investment can be used for each product. The solver compares the income from the product model with the essential income need and discretionary income need. In some examples, essential income need can be met at the first pre-determined confidence level or return assumption (for example, 0% return) and total (essential and discretionary) income need can be met at the second pre-determined confidence level (for example, 50% confidence level).

The product solver can be similar to the TIM solver in the way it can use the following calculated values:

Income needs can be computed the same way as for the TIM.

Income amounts paid by each product can be computed the same way as for the TIM. The difference here can be a different number of products to consider and different modeling can be required to calculate income payouts based on the behavior of each product in the universe.

The solver can attempt to solve for lifetime income purchases first, and then it can attempt to solve for additional income needs if any.

Income class purchase order can be directly applied to the products in each income class.

Funding priority order for each account type can be directly applied to products within each income class.

Tax treatment of purchases can be similar to that at the TIM level.

From here, the process differs from the TIM level solver in that the income portfolio can produce either too much or too little income at the first iteration and still have a valid solution in either case. At the TIM level, the starting point can be all available assets, so too little income can mean that the solver could not have enough assets to meet the income need. With the product income solver, it can start with the amount of assets used to purchase the TIM. To the extent that not all available assets were used to purchase the TIM, the income solver can scale product purchases up or down from the beginning purchase until the income need can be met. It can be possible to preserve the TIM weights in the final portfolio recommendation.

Annuity suitability can be addressed differently at this stage of the calculations. The solver can compute the suitability limits to determine the maximum amount of assets that can be invested in annuities for the product portfolio to remain suitable. To achieve this goal, the solver can calculate a number of multipliers, such as a lifetime total annuity multiplier or lifetime period certain annuity multiplier if the user is not in good health, additional income period certain annuity multiplier, and an additional income total annuity multiplier. If respective annuities are not purchased for the respective income need, that particular multiplier can be set to 100% of available assets. Once these multipliers have been calculated, the lowest of them can be used to define the maximum amount of assets that can be invested into annuities. After the maximum amount of assets is determined, using the TIM weights, the solver can determine the maximum amount of assets that can be annuitized to both stay within the annuity suitability limits and to preserve the TIM weights. This can be the upper bound of a purchase multiplier variable.

If the solver determines that the product model produces too much income, then the model can scale down the amount of assets used for the product portfolio. In this case, the bisection method can be used again. The solver can take half the asset amount used in the first iteration and repeats the process above. If the income goal cannot be met using half of the assets, then in the next iteration it can use 75% of the assets. If it still has too much income, the solver can half the current amount again, (e.g., use only 25% of the assets). In this iteration, the maximum allowed "suitable" amount of assets is used as a starting point for the upper bound and 0% of assets for the lower bound. Since the assets can be scaled down, there will not be the risk that purchase amounts can fall below the minimum investment amounts for individual products. To avoid this, at each iteration, the purchase amounts can be compared with their respective investment minimums. If a product cannot be purchased, the purchases can be aggregated according to the IPS product aggregation process.

If the product model cannot produce enough income, then the model can scale up the assets invested in the model portfolio. At this iteration, 100% of assets used to purchase the TIM can be used as a starting point for the lower bound and the upper bound can be the maximum allowed "suitable" amount of assets. The process for squeezing these bounds to find the solution is described above. Since the assets can be scaled up, there can be no risk that purchase amounts can fall below the minimum investment amounts for individual products.

If the entire asset amount can be used at the first iteration, the solver can stop stops and display the results. In this case, the product portfolio can cover the income need only partially. The TIM weights can be preserved and the portfolio can still pass annuity suitability requirements. Lifetime income goals can be met first, and only after that can an attempt to solve for additional income goal be made. Variable annuities can be excluded from the product set that can be used for the additional income need. The projected income for period certain annuities can be used to represent fixed annuities, and the process can start with assets remaining after the purchase of lifetime.

Once the dollar amounts to be invested into each product in the model can be determined, the solver needs to make sure that it can be possible to purchase every product. The solver can check the just computed dollar investments against product minimums and aggregate the amounts for those products whose minimums cannot be met into other parts of the product model portfolio. This check can be done in each iteration of the solver. The solver does a check for the variable annuity minimum amount, fixed annuity minimum amount, and the SWP aggregation and minimum amount.

For the lifetime income, if the GMWB amount is below the minimum and a variable annuity account is a part of the recommendation, the amount allocated to the GMWB amount can be transferred to the variable annuity. If a variable annuity is not part of the recommendation, the amount allocated to the GMWB amount can instead be transferred to the SWP account. These situations can be expected to be rare and occur in cases where the user's total asset value is low. For additional income need, variable annuities can be excluded.

Consider the mapping example above. After the mapping of the TIM to product models, the amount earmarked for the GMWB is $46,418. This amount can be below the minimum investment (for example, a typical representative minimum for this product can be $50,000). In this case, the GMWB amount can be transferred to Variable Income Annuity (whose typical representative minimum investment amount can be $25,000). In this example, the resulting amount that the solver can try to purchase can be $92,836 of Variable Income Annuity.

For the lifetime income need, if the minimum on either life or period-certain annuity (based on the answer to the health question of the preference questionnaire) is not met, the entire amount can be transferred to SWP, and fixed annuities cannot be purchased. For the additional income need, the duration of the additional income is first checked. In some examples, for period-certain annuities, the shortest available duration is 5 years. If the additional income goal is shorter than 5 years, the entire fixed annuity amount can be transferred to SWP and period-certain annuities cannot be offered as part of the solution. Second, if the minimum on period-certain annuity cannot be met, the entire amount can be transferred to SWP, and period-certain annuity cannot be purchased.

At each iteration after the initial one, the solver can check to see if any additional amounts can be transferred to the SWP income class from annuities. If so, those assets can be added to the total SWP asset amount. At the initial iteration of the income solver, it can be unknown if any amounts might be transferred to SWP. The solver can try to purchase products in the order of decreasing minimum investment reallocating funds in the next product in the product model and checking the new amount against that product's minimum. For the lifetime income goal, the solver can try to purchase managed products first, then single fund strategies, and then self-managed/generic investment portfolios with a SWP. Within these categories, the solver can buy the products in the following order: managed accounts, lifecycle/asset allocation funds, and self-managed SWP.

For the additional income goal, the SWP aggregation process can be the same for additional income periods of five years or longer. For shorter bridge periods, the self-managed SWP from a short-term fixed income fund can be a suggested solution. In some examples, the short-term fixed income fund can be represented by an 80% cash/20% bond allocation for bridge needs of 1-2 years and a 60% cash/40% bond allocation for bridge needs of 3-4 years. At implementation, the actual short-term investment vehicle used can be any combination of CDs, money market funds, short-term bond funds, bond ladders, CD ladders, and other short-term financial instruments.

The details of the solving procedure are the same as those used to solve for the TIM calculations, for both lifetime and additional income needs. The IPS incorporates the same annuity suitability rules at the product model level as those used at the TIM level.

At the product recommendation level, the solver can set a product purchase order that is determined by the investment amount that is required to meet the minimum investment. For the additional income need, variable annuities and lifetime fixed income annuities can be excluded.

The solver for the additional income can work the same way as the solver for the lifetime income. The starting asset amount for the additional income can be equal to the asset amount remaining after the purchase of lifetime income product portfolio. The product purchase order can be the same as the product purchase order at the TIM level for the products within each respective income class.

Income and Asset Projections

Income and asset projections can be computed at several points in the IPS process. The process begins by creating a database of base income and asset projections for all products in the product set. This database can be created at startup of the application.

Income projections can be calculated according to the payout behavior of each product and can be user-specific to the extent that income projections can use some of the general IPS inputs (e.g., length of plan, tax rates, and sustainable withdrawal rates for the SWP income class and products in it). Income projections can represent income amounts that can be paid for a $1,000 invested. Asset projections can be calculated in a similar fashion, but only for those products that have underlying assets (for example, SWP income class and products within it have underlying portfolios of assets, as well as variable annuities with a GMWB rider). Income and assets can be projected in both pre-tax and after-tax terms at the first and second pre-determined confidence levels and/or fixed return assumptions, as well as a variety of other confidence levels or return assumptions that can be used to illustrate the performance of the final income portfolio to the user. In various examples, the income and asset projections can be generated at the 0% return level and at the 25%, 50%, 75%, and 90% confidence levels for both lifetime and additional income needs for the corresponding time horizons. For the lifetime income need, the projections can be generated for the entire length of the retirement horizon. For the additional income need, the number of years of projections can be determined by the duration of the additional income need (user input). Since some products in the product universe can have fixed maturities, income and asset projections for those products can be computed for the entire length of retirement or the maximum available maturity of the product, whichever is shorter.

At this stage, before the engine has run, the after-tax income for annuities can be calculated as if the after-tax income for annuities is bought from a taxable account. IPS can assume that the cost basis of the taxable account is equal to its market value (e.g., the assets have already been taxed), and therefore, the purchase of any product in the taxable account does not result in a taxable liquidation of assets. In this case, the pre-tax income can be subject to capital gains and interest and dividends tax rates only (as opposed to the ordinary income tax). Later in the process, during the solving for the required income amount and at the end of the process when a portfolio recommendation with its income and asset projections is displayed, after-tax income projections for annuities can be recalculated to take into account the account type that the annuity is being purchased from. The after-tax projections for annuities that can be calculated at the beginning of the process are only used if those annuities are indeed purchased from the taxable account type.

Once the projected income database has been calculated, the engine can begin the TIM calculations followed by product portfolio calculations. At both of these levels, projected after-tax income can be used to match the user's income need. Since the income projections are calculated for a $1,000 investment, each projection can be multiplied by the actual assets invested divided by 1,000 to get the total monthly income amount that each purchase can produce. At this stage, the engine can have already determined the account types to buy the income classes or products from, and income projections can be partially recalculated to account for this additional information. The following logic can be used at both the TIM and product portfolio levels, for both lifetime and additional income needs, and for all confidence levels and the 0% return. If any product can be purchased in tax-deferred accounts, then no taxable distribution occurs, and the income is fully taxable at the ordinary income tax rate. The amount used is the pre-tax income amount minus the taxes. If any product can be purchased in taxable accounts, the after-tax (after capital gains and interest and dividends taxes) income projections can be used in the projected income database computed at the beginning of the IPS run. No additional processing can be required. If a product can be purchased in tax-free accounts, the pre-tax income projections from the Projected Income database can be used. No additional calculations can be done afterwards. For tax-deferred annuities, if the tax-deferred annuity can be converted into an income annuity, then the pre-tax income projections can be used, subtract taxes from them and add back the amount of tax subject to the exclusion ratio. The exclusion ratio applies for the life expectancy of the user and in that year the basis can be assumed to be fully recaptured. Projected income can go down beginning a year later. If the tax-deferred annuity assets cannot be converted into an income annuity (e.g., used for an investment product instead), then a taxable liquidation of assets occurs. The rate at which the assets are taxed can be the total tax to be paid on the earnings applied to the entire tax-deferred annuity account. In other words, suppose a user has a 25% effective tax rate, a $500K deferred annuity account with a $400K basis in it. To calculate the tax to be applied to the entire account, the process can multiply 25% times $100K and can divide by $500K. This calculation can give us a tax rate of 5%, which can then be applied to whatever asset amount can be determined to be used for the purchase of an investment product. The after-tax assets from the tax-deferred annuity can be transferred into a taxable account, and the after-tax (after capital gains and interest and dividends taxes) income can used directly from the projected income database.

Table 6 summarizes the above calculations. See below ("Tax Calculations in IPS") for more detail.

TABLE 6

|  |  | Cost Basis Assumption | | | |
| --- | --- | --- | --- | --- | --- |
|  |  | 0 Tax Deferred Account | IPS input Tax Deferred Annuity | 100% Tax Free | 100% Taxable |
| Annuities | Assets | Account Value | Account Value | Account Value | Account Value |
|  | Income | pre-tax * (1 − tax rate) | pre-tax * (1 − tax rate) + exclusion $ | pre-tax | after-tax |
| SWP | Assets | Account | Account Value * | Account | Account |

TABLE 6-continued

| | Cost Basis Assumption | | | |
|---|---|---|---|---|
| | 0<br>Tax Deferred<br>Account | IPS input<br>Tax Deferred<br>Annuity | 100%<br>Tax Free | 100%<br>Taxable |
| Income | Value<br>pre-tax *<br>(1 − tax rate) | (1 − annuity<br>tax rate)<br>after-tax | Value<br>pre-tax | Value<br>after-tax | pre-tax * (1 − tax rate) = taxed at the effective ordinary income tax rate
after-tax = capital gains and interest and dividends tax rates apply
annuity tax rate = tax rate * (annuity assets − cost basis)/annuity assets Asset projections can be computed at the end of the IPS process. Asset projections can be not used in the income portfolio calculations. They can be calculated at both the TIM and product portfolio levels, for lifetime and additional income needs, and for all confidence levels and the 0% return. For all account types, the pre-tax asset values can be used. The pre-tax asset values can be equivalent to after-tax assets, with the assumption that a tax-deferred annuity can be properly converted into an income annuity, in which case there cannot be a taxable liquidation of assets. If an investment product is purchased with tax-deferred annuity assets, the after-tax asset amount can be shown.

Tax Calculations in IPS

The nature of the assets used to purchase an immediate payout annuity (e.g., qualified vs. non-qualified) can determine if a portion of the income can be excluded from ordinary income taxation until all cost basis has been recaptured.

If a tax-deferred annuity can be converted to an income annuity at retirement, then the distributions are decomposed into a return of pre-tax principal and income realized from growth of the principal. Both components can be subject to taxation as neither has been taxed yet. If the user enters a cost basis for the deferred annuity, then an exclusion amount (e.g., dollars not subject to taxation as they are a return of principal that has already been taxed) can be calculated and income from the annuity can be taxed only partially.

If an immediate payout annuity can be purchased from tax-deferred accounts, an assumption can be made that no taxable distributions occur and the pre-tax value of assets can be used to buy the annuity. For taxable and tax-free accounts, the current pre-tax asset values can be used since these have already been taxed. Roth-type accounts have no basis. In some examples, the assumption for the taxable accounts (e.g., personal brokerage accounts) can be that the basis equals its current market value. This assumption can improve the user experience, because it can be desirable to limit the number of questions asked. In some examples, it can be possible to ask for the cost basis in the taxable account. Whether the cost basis information is available or not, the correct processing of basis can be in place in the IPS engine. Therefore, each payout from this annuity can be evaluated to determine an exclusion amount. The calculated non-exclusion component of the payout can be taxed at the ordinary income tax rate. The cost basis (return of principal) recapture can be tracked to determine when all principal has been returned as part of the annuity income payments over time. Once all principal has been returned, the entire income amounts can become subject to ordinary income tax. Since, in some examples, there can be a question asking for basis, and the logic can result in an exclusion amount of zero.

IPS can compute any necessary taxation of a periodic annuity payout. The after-tax proceeds can be reflective of an exclusion amount (if any, and defined as the portion of the overall payment not subject to taxation) or the remainder of the non-exclusion amount not consumed for a tax obligation. The tax rate used can be the user's estimated aggregate effective tax rate.

Annuity payouts realized over a tax year can be first evaluated to determine what portion represents the return of principal to be used in tax exclusion calculations. When exclusion amounts can be determined for a given tax year, the gross income payments can first be reduced by a tax exclusion amount and then the remainder is taxed at the total effective ordinary income tax rate. Payments that occur after the normal life expectancy can be attained for the individual/household (but prior to achieving the user supplied life plan age) with be taxed at 100% because at that point the annual tax exclusion amounts can be fully used up.

A variable annuity with a GMWB rider is a type of annuity that can be designed to distribute income based on the performance of the underlying portfolio and a guaranteed withdrawal percentage from the underlying portfolio. The GMWB product is not an annuitized vehicle in the sense that no exchange of assets for income takes place and the underlying portfolio assets are accessible to the policyholder. As such, it can track growth projections, end-of-year balances, and end-of-year cost basis (similar to asset accounts).

In IPS, the following rules can apply to the calculations of income projections for the GMWB: (1) Withdrawal amounts can be based on a starting age-based contract withdrawal rate; (2) Net total return of the underlying portfolio can be determined by either a model asset allocation, a simulated returns for stocks, bonds, and cash at the first and second pre-determined confidence levels, as well as a range of other pre-determined confidence levels that can be used to display the results to the user. For example, 0% return assumption, the 50% confidence level, and the 25%, 75%, and 90% confidence levels can be used, respectively. The household planning status (joint or single) can determine the appropriate annuity product ownership (joint & survivor or single life) and a GMWB rider fee as determined by the planning status of the household and type of product ownership; (3) the contractual features of the contract. For example, the "ratchet" feature of the contract can be part of the calculations of income projections—if the market is performing well and the balance on the next anniversary date (e.g., the date when the policy was first purchased) is greater than what it was a year ago, then the guaranteed payment can increase relative to last year's. The new payment can be calculated by multiplying the contractual withdrawal rate by the asset value on the anniversary date. This is called a "ratchet." If the market falls, then the guaranteed income amount can remain at the last calculated payment amount. Contractually, payments cannot go lower than any and all prior payments. The ratchet feature can have an age limit.

To calculate the after-tax income from the VIA with a GMWB rider, the withdrawal income amount in each year can be calculated and can be taxed at the aggregate household effective tax rate.

Calculations of income projections can be done for each model year and each confidence level or return assumption (e.g., the 0% return assumption, confidence levels of 25%, 50%, 75%, and 90%). The annual after-tax distribution, the end-of-year balance, and the end-of-year cost basis can rely on a calculated withdrawal amount based on the sustainable inflation-adjusted withdrawal rate; a calculated (net) total return based on a) asset mix, b) confidence level, c) simulated return for each model year, d) an associated fee (when applicable); a derived (pre-tax) ordinary income distribution amount; a derived (pre-tax) qualified dividend distribution amount; a derived (pre-tax) interest income distribution amount; a derived total (pre-tax) capital gain amount; a derived realized (pre-tax) short-term capital gain amount; a derived realized (pre-tax) long-term capital gain amount; a calculated unrealized capital gain amount; a derived (after-tax) ordinary income distribution amount; a derived (after-tax) qualified dividend distribution amount; a derived (after-tax) interest income distribution amount; a derived realized (after-tax) short-term capital gain amount; a derived realized (after-tax) long-term capital gain amount; a derived balance withdrawal need amount to supplement the projected withdrawal amount if and when distributions and gains are insufficient to meet the projected withdrawal need to meet the expenses for the calendar year being processed; a derived end-of-year balance after either a balance contribution is made to the withdrawal conditional to when realized incomes and realized gains are insufficient to meet the annual expense need or a current model year unrealized gain/loss recognition; and a derived end-of-year adjusted basis amount based on either basis reductions and/or basis additions necessary due to balance withdrawals, and/or undistributed realized gains/losses.

Product Edit and Substitution Mode

The IPS tool application can have an edit mode where the user can edit the suggested portfolio of products. The IPS can allow users to change the asset amount allocated to a product or delete the product, change product features based on lists of available features, change the account type to use for a particular product purchase, add a product that is not part of the suggested solution but available for substitution.

Once changes have been made, the tool can recalculate the income and asset projections for the new portfolio. The tool cannot make any changes to the part of the solution that the user chooses to keep intact. In other words, the tool cannot make any attempts to find a new solution that can meet the user's income need after the user makes the changes. It can display the income produced by the user-modified portfolio.

In addition to the asset amount, product features can be available for editing. Table 7 gives a sample list of such features.

TABLE 7

| Income Class | Features Available for Modification |
| --- | --- |
| Variable Income Annuity | Single/Joint |
| | Owner |
| | Funding account type |
| | Single/Joint |
| | Guarantee Period (10, 20 or life-only) |
| | Add Liquidity Provision |
| | Funding account type |
| Fixed Income Annuity | Issuer |
| | Single/Joint |
| | COLA % |
| | Guarantee Period |
| | Funding account type |
| | Number of years (for period-certain annuities) |
| Systematic Withdrawal Plan (SWP) | Asset Mix |
| | Withdrawal rate % |
| | Funding account type |
| | Pick a different fund (for Single Fund Solutions) |
| | Pick a different fund based on number of years |

The Edit mode can give the user the ability to add or delete products. For example, they user can delete a product by setting the asset amount to zero and recalculating. There can be products that can only be available in the Edit mode and can be added to the portfolio if desired. For example, in some embodiments, the user can add an individual bond or a bond ladder to the retirement income portfolio.

Handling of Unused Assets

Assets remaining in the user's accounts after the IPS solution has been determined can be projected in total at the pre-tax level assuming the user's TAM. To calculate the total pre-tax assets, all pre-tax assets remaining in all accounts can be added together, and the sum projected can use the same methodology as used for asset projections for the recommended TIM and Product Portfolio. The asset projections can be available at the 0% return and 25%, 50%, 75%, and 90% confidence levels.

Emergency Fund

In some examples, the user can be given the ability to set aside a certain asset amount for emergencies. This can be done before the modeling engine calculates a suggested solution. This can also be done if after the solution has been calculated, it is determined that the user has enough remaining assets to set aside an emergency fund. The emergency fund amount can be modified in the Edit mode and the unused assets cannot be allowed to be modified, but can be recalculated based on the changes to the asset amounts that the user can make. In some examples, asset projections can be shown for the emergency fund, and these assets can be projected using a pre-determined asset mix, for example, a 100% short-term investments portfolio. Asset projections can be available at the pre-determined return assumptions and confidence levels, for example, the 0% return assumption and 25%, 50%, 75%, and 90% confidence levels, respectively.

SWP-Only Solution

The SWP-only solution can be used as an alternative strategy that can be presented to the user in the IPS Tool. Including this strategy can be useful because many users can have a strong aversion to annuities. Even if the user answers the preference questions to indicate this aversion, IPS can still recommend that at least part of essential expenses be covered with guaranteed income. The user can receive the 100% SWP TIM only when annuities cannot be purchased because of any combination of low account balances, not meeting product minimums, or violating annuity suitability requirements.

Generally, a SWP-only solution can be expected to be less efficient than the suggested portfolio than includes annuities (e.g., a SWP-only solution can require more assets to produce the same amount of income as the suggested portfolio). And in some cases, the IPS recommendation can meet the income goals of the user, but the SWP-only solution cannot. Including a SWP-only strategy can have significant educational value to the user in both representative-led and self-directed (i.e., using the tool without the help of an advisor) interactions.

The SWP-only solution can be processed the same way as the 100% SWP TIM. It cannot be interpreted as the 100% SWP TIM, however, because here the TIM allocation (i.e., 100% SWP) is known in advance, and this portfolio can represent a solution from which annuities were taken out deliberately. The calculation process can still go through the solving procedure because the IPS still needs to determine the amount of assets required to meet the income need. Once that asset amount is known, the IPS can map into the appropriate SWP model portfolio, and solve for the income again. As for the SWP income class processing, the user's asset mix, and all income projections used can be based on the sustainable withdrawal rate at the pre-determined confidence level. For example, it can be the 90% confidence level.

Fixed Income Modeling

In some examples, fixed income ladders can be part of the IPS solution set. In some examples, the IPS tool can make fixed income ladders available in the product edit/substitution mode where a user is able to swap part of the proposed solution for a fixed income ladder.

A fixed income ladder can be a portfolio of fixed income instruments (bonds or CDs) with varying maturities. It has risk-return characteristics which can vary depending on the type of underlying bonds that can be invested in it. A fixed income ladder can be invested in debt securities of varying maturities and credit quality (Treasuries and Agencies, municipal bonds, corporate bonds, high yield bonds, etc.). As individual bonds comprising the ladder (rungs) mature, the investor can replenish the ladder by buying a new bond to match the maturity of the ladder. For instance, for a 5-year ladder, after the first year, the shortest rung in the ladder, the 1-year bond, can mature, and the maturities of the other four bonds can decrease by one year. A new 5-year bond can be purchased to maintain the overall maturity of the ladder.

The bond ladder can be modeled as a 100% Bond portfolio with the income withdrawn at a sustainable withdrawal rate for this portfolio. The sustainable withdrawal rates can be calculated at the pre-defined confidence levels (for example, 90% confidence level) for a range of retirement horizons (in some examples, from 1 to 50 years) based on standard capital market assumptions (i.e., expectations for the performance of the bond market) for the bond asset class. For the purposes of after-tax income projection calculations, the proxy for fixed income ladders can be treated as a 100% bond SWP purchased in the account that the user can choose on the product edit page. Standard income projection processing can be used for the calculation of after-tax returns for a SWP product using the inputs above (e.g., asset mix, sustainable withdrawal rate, returns at various confidence levels). Asset projections cannot be calculated using projected returns for the 100% Bond asset mix, since bond ladders provide no growth potential for the principal amount. Assets can be allocated to the bond ladder so that it can stay unchanged over time.

In some examples, a user supplied yield can be used to model the payment for the first year of the ladder, and the 100% Bond portfolio starting in year 2. In some embodiments, a table with current yields for various types of bonds can be shown to the user to educate the user about the current market and help determine potential payments from the bond ladder. For example, this table can include US Treasury bonds, municipal bonds, corporate bonds, etc. The bond yield information can be further broken down by credit rating. An example of a table like this is as follows:

| Potential Yields of hypothetical bond ladders. Please select a length to continue. | |
| --- | --- |
| Ladder Length | 5 |
| Corporate AAA/AA | 1.25% |
| Corporate A | 1.25% |
| Corporate BBB | 1.25% |
| Municipal AAA | 1.25% |
| Treasury | 1.25% |

Star Ratings

One of important goals of the Income Product Selector can be to educate the user about planning for retirement income and translate some of the results into a language that the user can readily understand. For example, IPS can provide various views of the features of the suggested Target Income Mix and a corresponding product portfolio.

For example, the suggested portfolio can be rated based on such features as growth, guarantee, flexibility and preservation. Growth can be defined as potential for asset growth, guarantee as the presence of guaranteed income, flexibility as access to assets, and preservation as potential preservation of principal.

In some examples, the three income classes in the TIM can be rated on a scale from 0 (does not have feature) to 1 (feature fully present) for each of the attributes. For example, the SWP income class can be rated 0 for Guarantee, and 1 for each of Growth (investment portfolio is fully exposed to the market), Flexibility (investment portfolio is fully accessible) and Potential Preservation (depending on the actual composition of the SWP, the portfolio may be able to partially or fully preserve the initial investment). Table 8 can be an example of such a lookup table.

TABLE 8

| | SWP | FIXED ANNUITY | VARIABLE ANNUITY |
| --- | --- | --- | --- |
| Guarantee | 0.0 | 1.0 | 0.5 |
| Growth | 1.0 | 0.0 | 0.5 |
| Flexibility | 1.0 | 0.0 | 0.5 |
| Potential Preservation | 1.0 | 0.0 | 0.5 |

To calculate the star ratings, the process can start by multiplying the weights of the final TIM by the ratings in Table 8 for each of the attributes. Then the numerical ratings can be mapped into the appropriate "star bracket". For example, the following brackets can be used: ratings of 66% or higher can get 3 stars, 33% to 65.99%, 2 stars, and any positive weight below 33%, 1 star. A rating of zero stars can be calculated if an income class does not have a particular feature.

For example, for the 70% SWP, 20% fixed annuity, and 10% variable annuity, the numerical ratings are as shown in Table 9.

TABLE 9

| Guarantee | Growth | Flexibility | Potential Preservation |
| --- | --- | --- | --- |
| 0.25 | 0.75 | 0.75 | 0.75 |
| * | *** | *** | *** |

In some examples, the star ratings can be calculated based on the composition of the final product portfolio. In these examples, each product can be rated on the attributes described above, and the rating for each income class can be calculated by multiplying the product ratings by their respective weight in the product model to produce an aggregate rating for the income classes. These ratings can help build the lookup table shown in Table 8. From there, the process is identical to the one described above.

The user can be presented with these star ratings for an "at-a-glance" view of their suggested strategy.

The above-described systems and methods can be implemented in digital electronic circuitry, in computer hardware, firmware, and/or software. The implementation can be as a computer program product (e.g., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method comprising:
receiving, by a computing device, a target income mix for a user, wherein the target income mix is expressed as a set of weights in a portfolio of one or more classes of income generating products, wherein one or more weights of the set of weights correspond to a first income need for essential expenses for the user during retirement and one or more remaining weights of the set correspond to a second income need for discretionary expenses for the user during retirement;
receiving, by the computing device, information about available assets for the user and their account location;
determining, by the computing device, using the set of weights of the target income mix, initial purchase amounts from the user's available assets for the one or more classes of income generating products;
determining, by the computing device, an amount of income that the one or more classes of income generating products are projected to produce throughout the user's retirement;
comparing, by the computing device, the first income need and second income need to the amount of income projected to be produced by the one or more classes of income generating products purchased using the initial purchase amounts; and
adjusting, by the computing device, the initial purchase amounts for each of the one or more classes of income generating products until the portfolio of the one or more classes of income generating products is projected to produce during retirement enough after-tax income to (i) meet the first income need at a first predetermined confidence level or return assumption and (ii) meet the first income need and the second income need at a second predetermined confidence level.

2. The method of claim 1 further comprising calculating, by the computing device, a projected pre-tax income and a projected after-tax income that can be produced by each of the one or more classes of income generating products over a user's retirement horizon.

3. The method of claim 2 further comprising calculating, by the computing device, the projected pre-tax income and the projected after-tax income throughout the user's retirement horizon at the predetermined confidence levels representing a Monte-Carlo simulated distribution of hypothetical income paid by the one or more classes of income generating products over the user's retirement horizon.

4. The method of claim 2 further comprising calculating, by the computing device, the projected pre-tax income and the projected after-tax income throughout the user's retirement horizon at a predetermined return assumption representing income projected to be paid by the one or more classes of income generating products over the user's retirement horizon in particular market conditions specified by the predetermined return assumption.

5. The method of claim 4 wherein the predetermined return assumption is a 0% fixed rate of return.

6. The method of claim 1 further comprising calculating, by the computing device, the projected pre-tax income and the projected after-tax income from the one or more classes of income generating products purchased using the initial purchase amounts or any subsequent purchase amounts at the midpoint in a user's retirement horizon.

7. The method of claim 1 wherein the one or more classes of income generating products includes at least one of fixed annuities, variable annuities, and an investment portfolio with a systematic withdrawal plan.

8. The method of claim 6 further comprising aggregating, by the computing device, the user's available assets by tax treatment according to account type.

9. The method of claim 6 further comprising calculating, by the computing device, the initial purchase amounts or any subsequent purchase amounts following a pre-determined account type funding order for each of the one or more classes of income generating products.

10. The method of claim 6 further comprising calculating, by the computing device, the initial purchase amounts or any subsequent purchase amounts following specific rules of taxation of assets and income for each account type that may be used to fund purchases of the one or more classes of income generating products.

11. The method of claim 6 further comprising comparing, by the computing device, the initial purchase amounts or any subsequent purchase amounts to predetermined minimum investment amounts for each of the one or more classes of income generating products.

12. The method of claim 6 further comprising redistributing, by the computing device, the initial purchase amounts or any subsequent purchase amounts if minimum investment requirements are not met.

13. The method of claim 6 further comprising comparing, by the computing device, purchase amounts for fixed and variable annuity income classes to predetermined annuitization limits as a measure of investable assets to meet annuity suitability requirements.

14. The method of claim 6 further comprising comparing, by the computing device, purchase amounts for fixed and variable annuity income classes to predetermined annuitization limits as a percent of liquid net worth to meet annuity suitability requirements.

15. The method of claim 6 further comprising redistributing, by the computing device, the initial purchase amounts or any subsequent purchase amounts if annuity suitability requirements are not met.

16. The method of claim 6 further comprising rounding, by the computing device, each weight in the set of weights to a predetermined percent increment.

17. The method of claim 7 wherein the target income mix includes a first percentage of assets to invest in the fixed annuities, a second percentage of assets to invest in the variable annuities, and a third percentage of assets to invest in the systematic withdrawal plan, wherein the first percentage of assets, the second percentage of assets, and the third percentage of assets meet the first income need and the second income need.

18. The method of claim 7 wherein the target income mix includes a first percentage of assets to invest in the fixed annuities and a second percentage of assets to invest in the systematic withdrawal plan, wherein the first percentage of assets and the second percentage of assets meet a third income need having a fixed duration shorter than a lifetime need for the user in retirement.

19. The method of claim 7 wherein the portfolio of the one or more classes of income generating products produces enough income to meet a third income need having a fixed duration shorter than a lifetime need for the user in retirement.

20. A computer program product, tangibly embodied in a computer-readable storage medium, the computer program product including instructions being operable to cause a data processing apparatus to:

receive a target income mix for a user, wherein the target income mix is expressed as a set of weights in a portfolio of one or more classes of income generating products, wherein one or more weights of the set of weights correspond to a first income need for essential expenses for the user during retirement and one or more remaining weights of the set correspond to a second income need for discretionary expenses for the user during retirement;

receive information about available assets for the user and their account location;

determine, using the set of weights of the target income mix, initial purchase amounts from the user's available assets for the one or more classes of income generating products;

determine an amount of income that the one or more classes of income generating products are projected to produce throughout the user's retirement;

compare the first income need and second income need to the amount of income projected to be produced by the one or more classes of income generating products purchased using the initial purchase amounts; and adjust the initial purchase amounts for each of the one or more classes of income generating products until the portfolio of the one or more classes of income generating products is projected to produce during retirement enough after-tax income to (i) meet the first income need at a first predetermined confidence level or return assumption and (ii) meet the first income need and the second income need at a second predetermined confidence level.

21. A system comprising:

a computing processor configured to:

receive a target income mix for a user, wherein the target income mix is expressed as a set of weights in a portfolio of one or more classes of income generating products, wherein one or more weights of the set of weights correspond to a first income need for essential expenses for the user during retirement and one or more remaining weights of the set correspond to a second income need for discretionary expenses for the user during retirement;

receive information about available assets for the user and their account location;

determine, using the set of weights of the target income mix, initial purchase amounts from the user's available assets for the one or more classes of income generating products;

determine an amount of income that the one or more classes of income generating products are projected to produce throughout the user's retirement;

compare the first income need and second income need to the amount of income projected to be produced by the one or more classes of income generating products purchased using the initial purchase amounts; and adjust the initial purchase amounts for each of the one or more classes of income generating products until the portfolio of the one or more classes of income generating products is projected to produce during retirement enough after-tax income to (i) meet the first income need at a first predetermined confidence level or return assumption and (ii) meet the first income need and the second income need at a second predetermined confidence level.

\* \* \* \* \*